(12) United States Patent
Yoshida et al.

(10) Patent No.: US 11,082,621 B2
(45) Date of Patent: Aug. 3, 2021

(54) OBJECT INSPECTION DEVICE, OBJECT INSPECTION SYSTEM AND METHOD FOR ADJUSTING INSPECTION POSITION

(71) Applicant: Fanuc Corporation, Yamanashi (JP)

(72) Inventors: Junichirou Yoshida, Yamanashi (JP); Shouta Takizawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/508,806

(22) Filed: Jul. 11, 2019

(65) Prior Publication Data

US 2020/0021743 A1 Jan. 16, 2020

(30) Foreign Application Priority Data

Jul. 13, 2018 (JP) .............................. JP2018-133501

(51) Int. Cl.
| | | |
|---|---|---|
| *H04N 5/232* | (2006.01) | |
| *G06T 7/00* | (2017.01) | |
| *G06T 7/73* | (2017.01) | |
| *B25J 9/16* | (2006.01) | |
| *H04N 5/225* | (2006.01) | |
| *H04N 5/247* | (2006.01) | |

(52) U.S. Cl.
CPC ........ *H04N 5/23299* (2018.08); *B25J 9/1697* (2013.01); *G06T 7/0004* (2013.01); *G06T 7/73* (2017.01); *H04N 5/2253* (2013.01); *H04N 5/247* (2013.01); *G06T 2207/30244* (2013.01)

(58) Field of Classification Search
CPC ......... H04N 5/23299; G06T 7/73; G06T 7/70; G06T 7/0004; G06T 2207/30244; B25J 9/1697
See application file for complete search history.

(56) References Cited

U.S. PATENT DOCUMENTS

| | | | | | |
|---|---|---|---|---|---|
| 4,146,924 | A | * | 3/1979 | Birk ....................... | B25J 9/1692 318/568.13 |
| 4,891,767 | A | * | 1/1990 | Rzasa .................... | B25J 9/1692 382/151 |
| 6,101,455 | A | * | 8/2000 | Davis .................... | B25J 9/1697 382/153 |

(Continued)

FOREIGN PATENT DOCUMENTS

| | | |
|---|---|---|
| JP | 61173878 A | 8/1986 |
| JP | 07084631 A | 3/1995 |

(Continued)

*Primary Examiner* — Michael Robert Cammarata
(74) *Attorney, Agent, or Firm* — RatnerPrestia

(57) ABSTRACT

An object inspection device capable of sharing an image or an inspection parameter for surface inspection of an object to be inspected among a plurality of object inspection devices. The object inspection device includes a camera, a robot relatively positioning the object and the camera, an index, and a controller controlling the camera and the robot. The controller is configured to control the robot to position the index and the camera at any relative position, cause the camera to image the index to acquire imaged data of the index, hold the robot at a position where the index is disposed at an index reference point in the image coordinate system based on the imaged data and coordinate data of the index reference point, and adjust an inspection position using the position of the robot at this time.

11 Claims, 18 Drawing Sheets

(56) References Cited

U.S. PATENT DOCUMENTS

| | | | |
|---|---|---|---|
| 6,114,824 A * | 9/2000 | Watanabe | B25J 9/1697 29/407.04 |
| 6,681,151 B1 * | 1/2004 | Weinzimmer | B25J 9/1697 219/121.85 |
| 7,200,260 B1 * | 4/2007 | Watanabe | B25J 9/1692 382/103 |
| 9,075,411 B2 * | 7/2015 | Aiso | G05D 3/00 |
| 10,388,010 B2 * | 8/2019 | Feng | G06T 7/70 |
| 2002/0184755 A1 * | 12/2002 | Suhara | H05K 13/0413 29/833 |
| 2005/0131582 A1 * | 6/2005 | Kazi | B25J 9/1697 700/259 |
| 2006/0102839 A1 * | 5/2006 | Bhaskar | G06T 7/0004 250/310 |
| 2006/0142971 A1 * | 6/2006 | Reich | G01C 17/00 702/150 |
| 2011/0022216 A1 * | 1/2011 | Andersson | G05B 19/401 700/114 |
| 2012/0072021 A1 | 3/2012 | Walser et al. | |
| 2012/0096702 A1 * | 4/2012 | Kingsley | E04H 7/06 29/561 |
| 2013/0010081 A1 * | 1/2013 | Tenney | G06T 7/80 348/47 |
| 2013/0231779 A1 * | 9/2013 | Purkayastha | B25J 9/1697 700/259 |
| 2016/0001983 A1 * | 1/2016 | Ooba | B65G 37/00 414/787 |
| 2016/0035079 A1 * | 2/2016 | Tenney | A61B 34/30 382/153 |
| 2016/0184996 A1 * | 6/2016 | Ishige | B25J 9/1694 700/254 |
| 2016/0214255 A1 * | 7/2016 | Uhlenbrock | B25J 9/1697 |
| 2017/0066133 A1 * | 3/2017 | Ooba | B25J 9/1697 |
| 2017/0249745 A1 * | 8/2017 | Fiala | G02B 27/0093 |
| 2017/0274534 A1 * | 9/2017 | Takahashi | B25J 19/023 |
| 2018/0047178 A1 * | 2/2018 | Kay | G06T 7/73 |
| 2018/0126553 A1 * | 5/2018 | Corkum | B25J 9/1692 |
| 2018/0224825 A1 * | 8/2018 | Tamai | B25J 9/1697 |
| 2018/0231474 A1 | 8/2018 | Yoshida et al. | |
| 2018/0296283 A1 * | 10/2018 | Crawford | G06T 7/33 |
| 2018/0297198 A1 | 10/2018 | Dan et al. | |
| 2018/0339456 A1 * | 11/2018 | Czinger | B33Y 10/00 |
| 2018/0361587 A1 * | 12/2018 | Purrucker | B25J 9/0093 |
| 2019/0015989 A1 * | 1/2019 | Inazumi | B25J 9/1697 |
| 2019/0030722 A1 * | 1/2019 | Yamaguchi | B25J 9/1664 |
| 2019/0099887 A1 * | 4/2019 | Huang | G01B 11/005 |
| 2019/0308320 A1 * | 10/2019 | Konishi | G06K 9/00208 |

FOREIGN PATENT DOCUMENTS

| | | |
|---|---|---|
| JP | 2003302345 A | 10/2003 |
| JP | 2005249729 A | 9/2005 |
| JP | 2010239041 A | 10/2010 |
| JP | 2013221767 A | 10/2013 |
| JP | 2014219301 A | 11/2014 |
| JP | 2017-015396 A | 1/2017 |
| JP | 2017077614 A | 4/2017 |
| JP | 6356845 B1 | 7/2018 |

* cited by examiner

OBJECT INSPECTION DEVICE, OBJECT INSPECTION SYSTEM AND METHOD FOR ADJUSTING INSPECTION POSITION

CROSS-REFERENCE TO RELATED APPLICATIONS

This application is a new U.S. Patent Application that claims benefit of Japanese Patent Application No. 2018-133501, dated Jul. 13, 2018, the disclosure of this application is being incorporated herein by reference in its entirety for all purposes.

BACKGROUND OF THE INVENTION

1. Field of the Invention

The invention relates to an object inspection device, an object inspection system, and a method for adjusting an inspection position.

2. Description of the Related Art

There has been known an object inspection device that inspects a surface of an object by using image data of the object (e.g., JP 2017-015396 A). Sharing an imaged image or inspection parameter used for a surface inspection on an object to be inspected among a plurality of object inspection devices has been requested.

SUMMARY OF THE INVENTION

In an aspect of the present disclosure, an object inspection device for inspecting a surface of an object using image data of the object, includes a camera configured to acquire the image data; a robot configured to relatively position the object and the camera at an inspection position where the surface is to be inspected; an index configured to be positioned with respect to the camera by the robot and imaged by the camera, the index being configured for representing a position of the index with respect to the camera in an image coordinate system of the camera; and a controller configured to control the camera and the robot.

The controller is configured to control the robot so as to position the index and the camera at a relative position; cause the camera to image the index positioned at the relative position to acquire imaged data of the index in the image coordinate system; based on the imaged data and coordinate data of an index reference point set in the image coordinate system, hold the robot at a position where the index is disposed at the index reference point in the image coordinate system; and adjust the inspection position using the position of the robot when the index is disposed at the index reference point.

In another aspect of the present disclosure, an object inspection system comprises a plurality of object inspection devices configured to inspect a surface of an object using image data of the object, wherein the first object inspection device includes a first camera configured to acquire the image data; a first robot configured to relatively position the object and the first camera at a first inspection position where the surface is to be inspected; a first index configured to be positioned with respect to the first camera by the first robot and imaged by the first camera, the first index being configured for representing a position of the first index with respect to the first camera in a first image coordinate system of the first camera; and a first controller configured to control the first camera and the first robot.

The first controller is configured to control the first robot so as to position the first index and the first camera at a first relative position; cause the first camera to image the first index positioned at the first relative position to acquire imaged data of the first index in the first image coordinate system, and store the imaged data as coordinate data of index reference point.

A second object inspection device includes a second camera configured to acquire the image data; a second robot configured to relatively position the object and the second camera at a second inspection position where the surface is to be inspected, the second inspection position corresponding to the first inspection position; a second index configured to be positioned with respect to the second camera by the second robot and imaged by the second camera, the second index being configured for representing a position of the second index with respect to the second camera in a second image coordinate system of the second camera, the second image coordinate system corresponding to the first image coordinate system; and a second controller configured to control the second camera and the second robot.

The second controller is configured to control the second robot so as to position the second index and the second camera at a second relative position corresponding to the first relative position; cause the second camera to image the second index positioned at the second relative position to acquire imaged data of the second index in the second image coordinate system; based on the imaged data of the second index and the coordinate data of the index reference point stored in the first controller, hold the second robot at a position where the second index is disposed at the index reference point in the second image coordinate system; and adjust the second inspection position using the position of the second robot when the second index is disposed at the index reference point.

In still another aspect of the present disclosure, a method of adjusting an inspection position, where a surface of an object is to be inspected, in an object inspection device for inspecting the surface using image data of the object, includes controlling a robot so as to position an index and a camera at a relative position; causing the camera to image the index positioned at the relative position to acquire imaged data of the index in an image coordinate system; based on the imaged data of the second index and the stored coordinate data of the index reference point, holding the robot at a position where the index is disposed at the index reference point in the image coordinate system; and adjusting the inspection position using the position of the robot when the index is disposed at the index reference point.

In still another aspect of the present disclosure, a method of adjusting an inspection position, where a surface of an object is to be inspected, in an object inspection system including a plurality of object inspection devices each configured to inspect the surface using image data of the object, includes controlling a first robot so as to position a first index and a first camera at a first relative position; causing the first camera to image the first index positioned at the first relative position to acquire imaged data of the first index in a first image coordinate system, and store the imaged data as coordinate data of index reference point; controlling a second robot so as to position second index and a second camera at a second relative position corresponding to the first relative position; causing the second camera to image the second index positioned at the second relative position to acquire imaged data of the second index in a second image coordinate system; based on the imaged data of the second index and the stored coordinate data of the index reference point, holding the second robot at a position where the second index is disposed at the index reference point in the second image coordinate system; and adjusting a second inspection position using the position of the second robot when the second index is disposed at the index reference point.

According to the present disclosure, the inspection parameter can be shared among the plurality of object inspection devices. The image data imaged in the plurality of object inspection devices can be shared among the plurality of object inspection devices and are usable for, e.g., machine learning.

DETAILED DESCRIPTION

Figure 1:
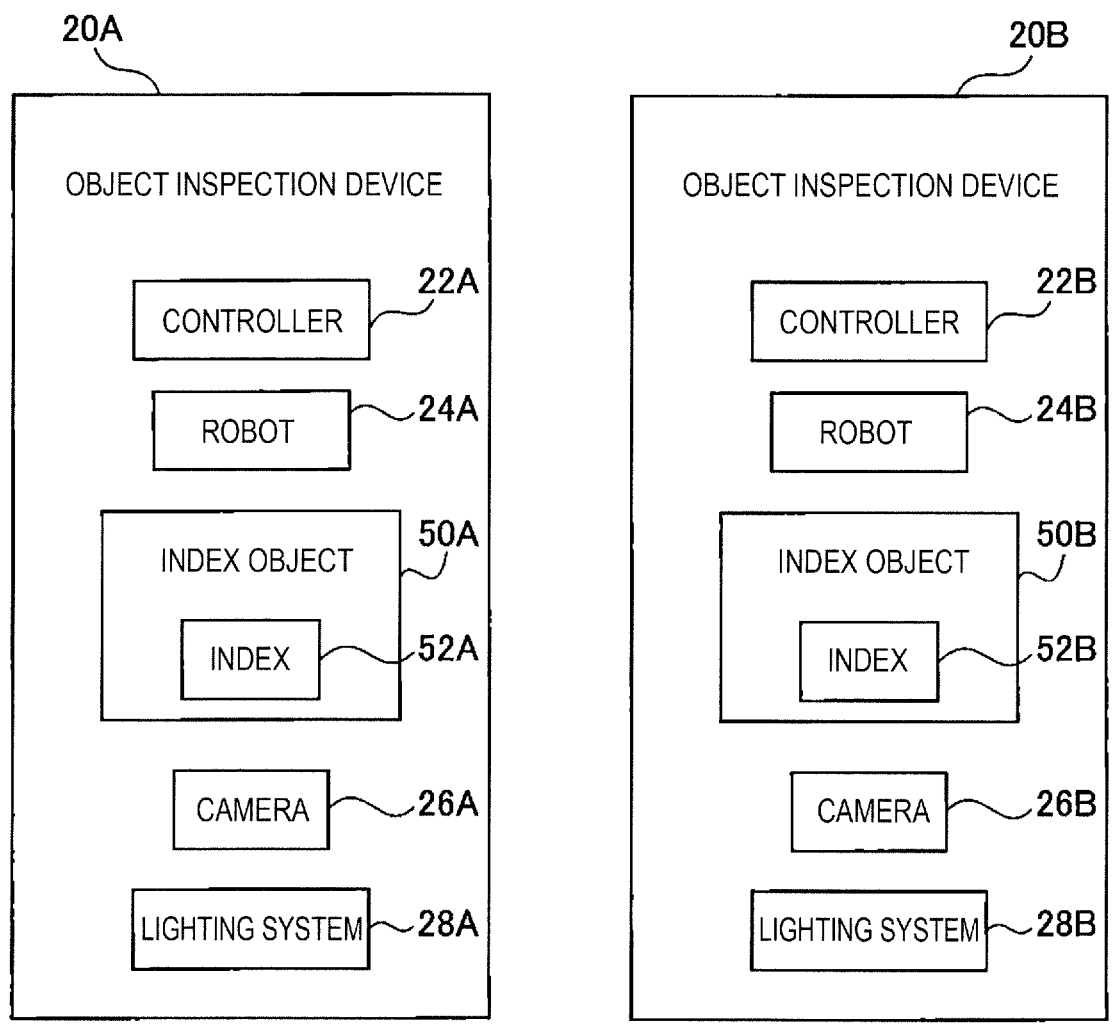
FIG. 1 is a block diagram of an object inspection system according to an embodiment.

Embodiments of the present disclosure will be described in detail below, with reference to the drawings. Note that, in the various embodiments to be described below, the same reference numerals are given to similar components, and redundant descriptions thereof will be omitted. First, with reference to FIG. 1, an object inspection system 10 according to an embodiment is described.

The object inspection system 10 includes a plurality of object inspection devices 20A and 20B. Each of the object inspection devices 20A and 20B carries out a surface inspection of an object to be inspected, using image data of the object imaged by a camera, as described later. The object inspection devices 20A and 20B may be installed in a same factory (e.g., a same manufacturing line), or may be installed in different factories.

Next, with reference to FIG. 1 to FIG. 4, the (first) object inspection device 20A is described. The object inspection device 20A includes a controller 22A, a robot 24A, a camera 26A, a lighting system 28A, and an index object 50A. The controller 22A includes e.g. a processor (CPU, GPU) and a memory (RAM, ROM), and controls the robot 24A, the camera 26A, and the lighting system 28A.

In this embodiment, the robot 24A is a vertical articulated robot including a robot base 30, a turning body 32, a robot arm 34, a wrist 36, and a robot hand 38. The robot base 30 is fixed on a floor of a work cell. The turning body 32 is provided at the robot base 30 so as to be rotatable about a vertical axis.

The robot arm 34 includes a lower arm 40 rotatably coupled to the turning body 32 and an upper arm 42 rotatably coupled to a distal end of the lower arm 40. The wrist 36 is mounted to a distal end of the upper arm 42 so as to rotatably support the robot hand 38.

Figure 3:
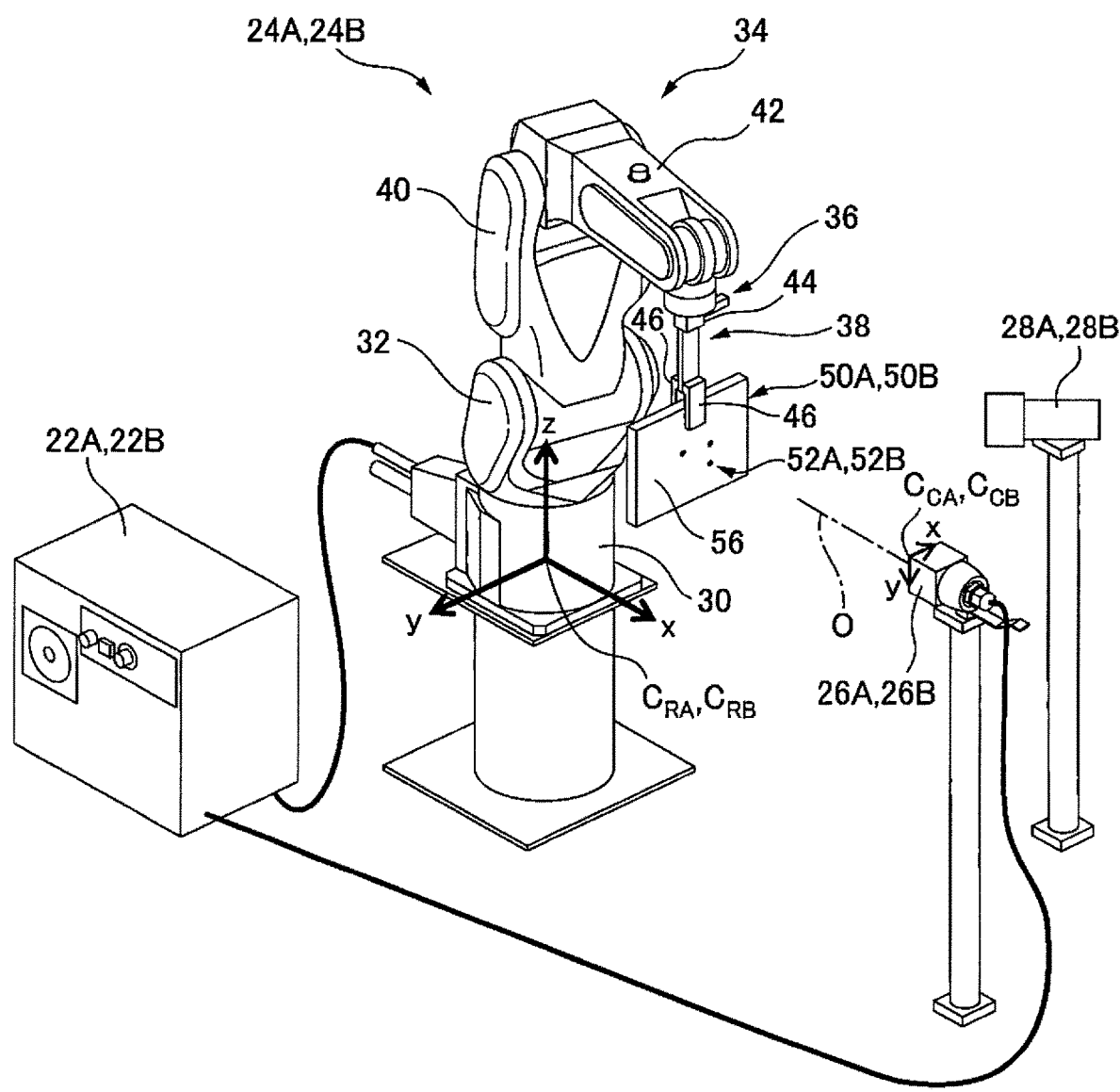
FIG. 3 is a perspective view of the object inspection device illustrated in FIG. 2.

As illustrated in FIG. 3, the robot hand 38 includes a hand base 44, a plurality of fingers 46, and a finger driver (not illustrated). The hand base 44 is coupled to the wrist 36. The plurality of fingers 46 are provided at the hand base 44 so as to open and close. The finger driver is e.g. an air cylinder built in the hand base 44. In response to a command from the controller 22A, the finger driver causes the fingers 46 to open and close.

Figure 2:
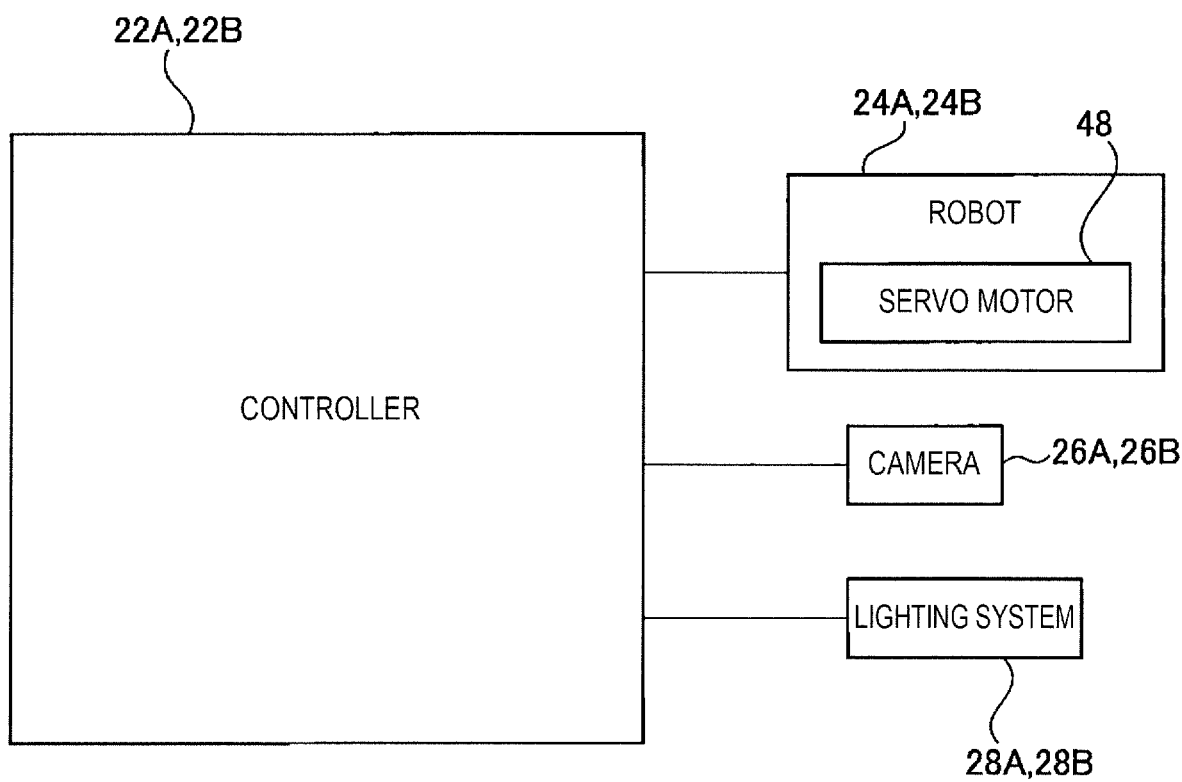
FIG. 2 is a block diagram of an object inspection device illustrated in FIG. 1.

The robot 24A includes a plurality of servomotors 48 (FIG. 2). The servomotors 48 are built in the robot base 30, the turning body 32, the robot arm 34, and the wrist 36 of the robot 24A, respectively, and drive the movable elements (i.e., the turning body 32, the robot arm 34, and the wrist 36) of the robot 24A in response to commands from the controller 22A.

A robot coordinate system $C_{RA}$ (FIG. 3) is set as a coordinate system for controlling the respective movable elements of the robot 24A. The controller 22A operates the respective movable elements of the robot 24A with reference to the robot coordinate system $C_{RA}$, and disposes the robot hand 38 at any position in the robot coordinate system $C_{RA}$. Note that the "position" in the present disclosure may mean the position and orientation.

For example, the robot coordinate system $C_{RA}$ is set for the robot 24A such that the origin thereof is disposed at the center of the robot base 30, a z-axis thereof is parallel to a vertical direction of a real space, and the turning body 32 is turned about the z-axis.

The camera 26A includes an optical system such as a focus lens, and an image sensor such as a CCD or CMOS sensor. In this embodiment, the camera 26A is fixed at a predetermined position in the robot coordinate system $C_{RA}$ so as to be separate away from the robot 24A. In response to a command from the controller 22A, the camera 26A images an object gripped by the robot 24A, and transmits the captured image data to the controller 22A.

An image coordinate system $C_{CA}$ is set for the camera 26A. The image coordinate system $C_{CA}$ is a coordinate system defining a field of view of the camera 26A, and each pixel of the image data imaged by the camera 26A can be expressed as coordinates in the image coordinate system $C_{CA}$. The robot coordinate system $C_{RA}$ and the image coordinate system $C_{CA}$ are calibrated with each other in advance, and the coordinates in one of the robot coordinate system $C_{RA}$ and the image coordinate system $C_{CA}$ can be transformed into the coordinates in the other of the robot coordinate system $C_{RA}$ and the image coordinate system $C_{CA}$, via a transformation matrix (e.g., a Jacobian matrix).

Thus, a fixed position of the camera 26A and an optical axis O of the camera 26A (i.e., an optical path of a subject image incident on the optical system of the camera 26A) can be expressed as coordinates in the robot coordinate system $C_R$, and the controller 22A can recognize the positions of the camera 26A and the optical axis O in the robot coordinate system $C_R$.

In this embodiment, the optical axis O of the image coordinate system $C_{CA}$ and the x-axis of the robot coordinate system $C_{RA}$ are parallel. As described later, when carrying out a surface inspection of the object to be inspected by the object inspection device 20A, the object and the camera 26A are positioned at a predetermined first inspection position by the robot 24A.

The lighting system 28A includes an incandescent lamp, a fluorescent lamp, LED, or the like, and is fixed at a predetermined position. The lighting system 28A is turned ON/OFF in response to a command from the controller 22A, and irradiates light onto the object gripped by the robot 24A when being turned ON.

Figure 4:
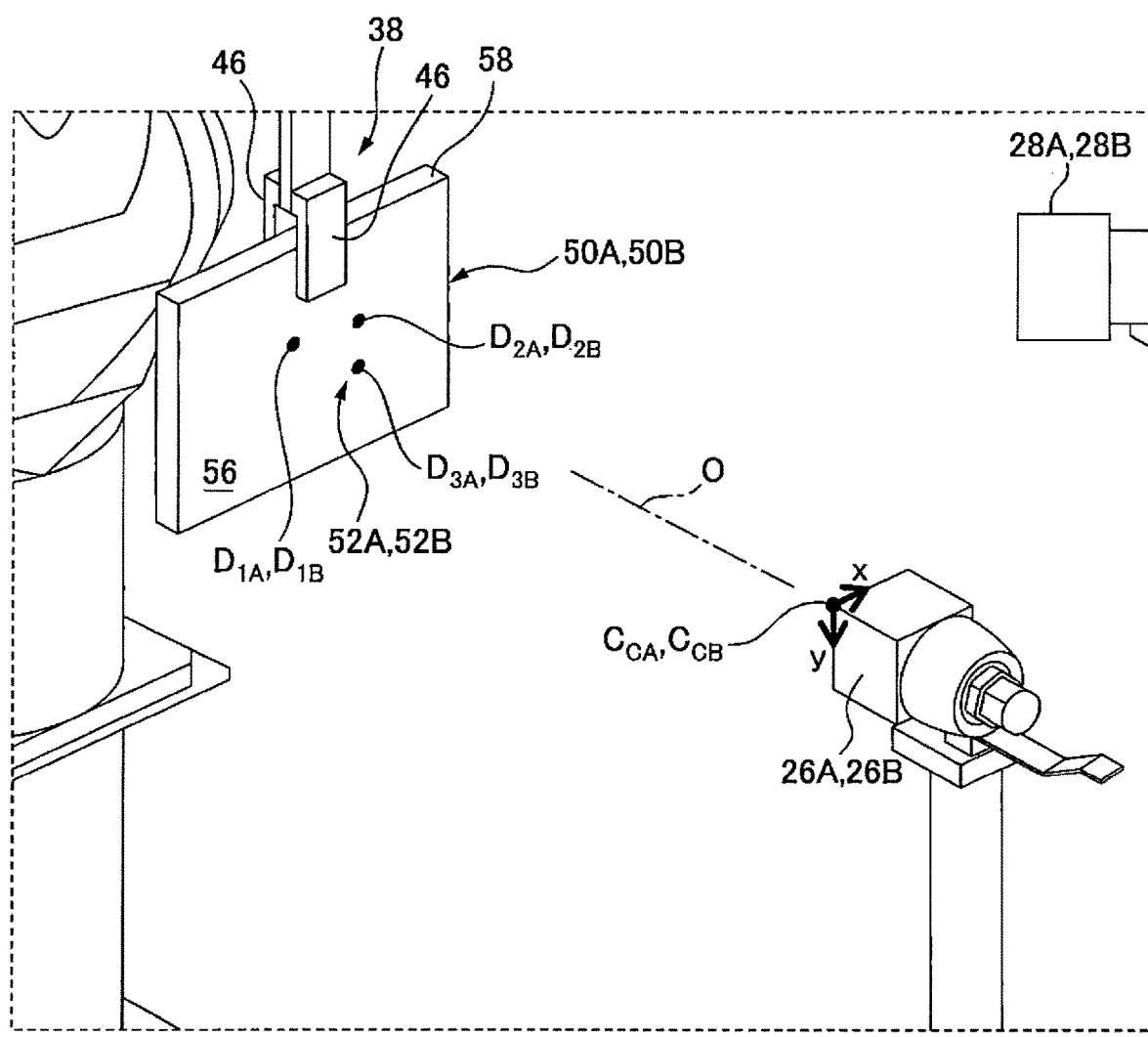
FIG. 4 is an enlarged view enlarging a part of the object inspection device illustrated in FIG. 3.
Figure 11:
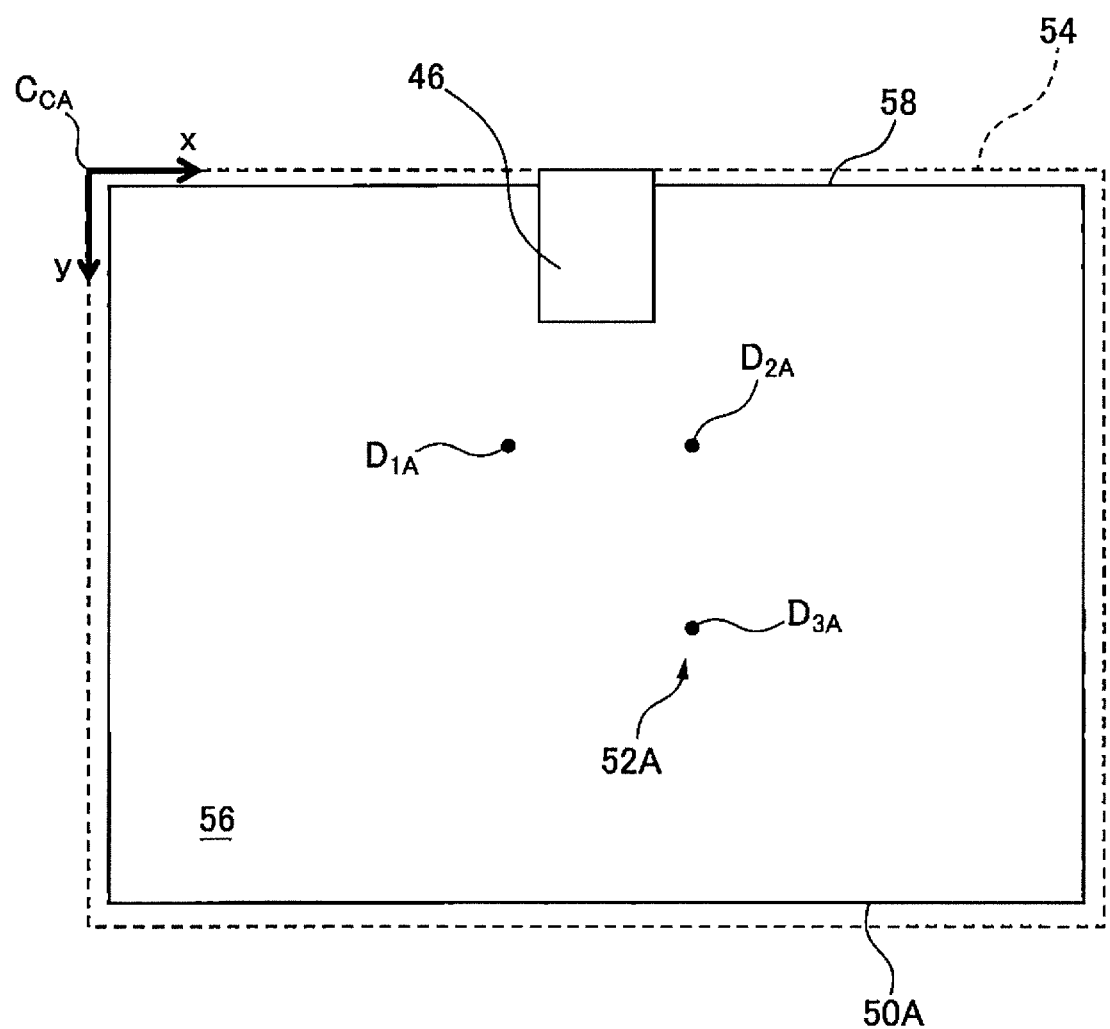
FIG. 11 is an example of an image imaged by a camera in step S2 in FIG. 5.

As illustrated in FIGS. 3, 4, and 11, the index object 50A is a flat plate member having an approximately rectangular shape, and includes an index 52A on its surface 56. In this embodiment, the index 52A has a total of three circular dots $D_{1A}$, $D_{2A}$, and $D_{3A}$. The index 52A may be e.g. painted marks drawn on the surface 56, or engraved marks formed on the surface 56. As described later, the index 52A is for representing the position of the index 52A with respect to the camera 26A in the image coordinate system $C_{CA}$.

The (second) object inspection device 20B has a configuration similar to that of the object inspection device 20A. Specifically, the object inspection device 20B includes a controller 22B, a robot 24B, a camera 26B, and a lighting system 28B, and an index 50B. The controller 22B includes e.g. a processor and a memory (not illustrated), and controls the robot 24B, the camera 26B, and the lighting system 28B. The controller 22B may be wiredly or wirelessly connected to the above-described controller 22A so as to be able to communicate with each other.

Similar to the robot 24A, the robot 24B includes the robot base 30, the turning body 32, the robot arm 34, the wrist 36, the robot hand 38, and the servomotor 48. A robot coordinate system $C_{RB}$ (FIG. 3) is set for the robot 24B. The controller 22B operates the respective movable elements of the robot 24B with reference to the robot coordinate system $C_{RB}$, and disposes the robot hand 38 at any position in the robot coordinate system $C_{RB}$.

In this embodiment, the robot coordinate system $C_{RB}$ is set with respect to the robot 24B such that the positional relation (the position of the origin and the directions of the axes) of the robot coordinate system $C_{RA}$ with respect to the robot 24A is the same as that of the robot coordinate system $C_{RB}$ with respect to the robot 24B.

Specifically, the robot coordinate system $C_{RB}$ is set with respect to the robot 24B such that the origin of the robot coordinate system $C_{RB}$ is disposed at the center of the robot base 30 of the robot 24B, the z-axis of the robot coordinate system $C_{RB}$ is parallel to the vertical direction of the real space, and the turning body 32 of the robot 24B is rotated about the z-axis of the robot coordinate system $C_{RB}$. Furthermore, the x-axis of the robot coordinate system $C_{RB}$ and the optical axis of the camera 26B are parallel.

In order to set the positional relation of the robot coordinate system $C_{RA}$ with respect to the robot 24A and the positional relation of the robot coordinate system $C_{RB}$ with respect to the robot 24B so as to be the same each other, the robot hand 38 of the robot 24A and the robot hand 38 of the robot 24B are caused to touch a same position. It is possible to set the robot coordinate systems $C_{RA}$ and $C_{RB}$ such that the positional relation of the robot coordinate system $C_{RA}$ with respect to the robot 24A and the positional relation of the robot coordinate system $C_{RB}$ with respect to the robot 24B is the same, using positional data of the robot coordinate systems $C_{RA}$ and $C_{RB}$ and position data of each movable element of the robots 24A and 24B.

The camera 26B has an optical specification the same as that of the camera 26A. The optical specification includes e.g. an angle of view, a height of field of view, and a resolution (the number of pixels of the image sensor). For example, the cameras 26A and 26B are cameras of the same type. An image coordinate system $C_{CB}$ is set for the camera 26B.

Each pixel of the image data imaged by the camera 26B can be expressed as coordinates in the image coordinate system $C_{CB}$. The image coordinate system $C_{CB}$ of the camera 26B corresponds to the image coordinate system $C_{CA}$ of the camera 26A. The robot coordinate system $C_{RB}$ and the image coordinate system $C_{CB}$ are calibrated in advance, and the coordinates in one of the robot coordinate system $C_{RB}$ and the image coordinate system $C_{CB}$ can be transformed into the coordinates in the other of the robot coordinate system $C_{RB}$ and the image coordinate system $C_{CB}$, via a transformation matrix (e.g., a Jacobian matrix).

The positional relation between the robot coordinate system $C_{RB}$ and the image coordinate system $C_{CB}$ (i.e., the origin position and the direction of each axis of the image coordinate system $C_{CB}$ with respect to the robot coordinate system $C_{RB}$) is the same as the positional relation between the above-described robot coordinate system $C_{RA}$ and image coordinate system $C_{CA}$ (the origin position and the directions of each axis of the image coordinate system $C_{CA}$ with respect to the robot coordinate system $C_{RA}$). When carrying out the surface inspection of the object to be inspected by the object inspection device 20B, the object to be inspected and the camera 26B are positioned at a second inspection position corresponding to the above-described first inspection position by the robot 24B.

The index object 50B has an outer shape the same as the above-described index object 50A, and includes an index 52B on its surface 56, as illustrated in FIGS. 3 and 4. The index 52B has a total of three circular dots $D_{1B}$, $D_{2B}$, and $D_{3B}$. The positions of the dots $D_{1B}$, $D_{2B}$, and $D_{3B}$ on the surface 56 of the index object 50B are the same as those of the dots $D_{1A}$, $D_{2A}$, and $D_{3A}$ on the surface 56 of the index object 50A, respectively. The index 52B may be painted marks drawn on the surface 56 or engraved marks formed on the surface 56. The index 52B is for representing the position of the index 52B with respect to the camera 26B in the image coordinate system $C_{CB}$.

Figure 5:
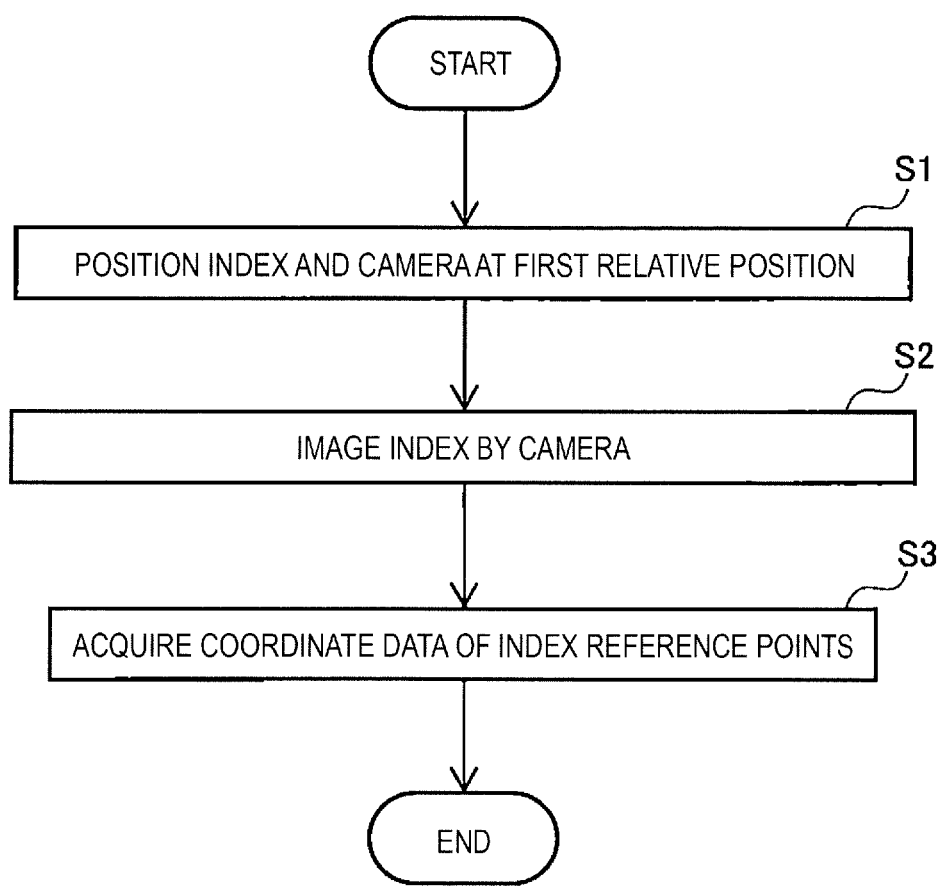
FIG. 5 is a flowchart depicting an example of an operation flow of a first object inspection device.

Next, an operation of the object inspection system 10 will be described with reference to FIGS. 5 to 10. First, the flow depicted in FIG. 5 is carried out in the object inspection device 20A. The flow depicted in FIG. 5 is started when the controller 22A of the object inspection device 20A receives a coordinate data acquisition command from a host controller, an operator, or a computer program.

In step S1, the controller 22A operates the robot 24A so as to position the index object 50A and the camera 26A at a first relative position. Specifically, the controller 22A operates the robot 24A so as to grip the index object 50A, which is stored in a predetermined storage location, with the robot hand 38 at a predetermined index gripping position. The index gripping position is e.g. a center of an upper surface 58 of the index object 50A.

Next, the controller 22A operates the robot 24A so as to move the index object 50A, and positions the index object 50A at the first relative position with respect to the camera 26A. The first relative position is predetermined by the operator. The controller 22A pre-stores in the memory a relative position command for positioning the index object 50A at the first relative position with respect to the camera 26A, and transmits the relative position command to each servomotor 48 of the robot 24A to operate the robot 24A.

In this embodiment, when the index object 50A and the camera 26A are disposed at the first relative position, the entire index object 50A is within the field of view of the camera 26A. However, it is only necessary that at least the dots $D_{1A}$, $D_{2A}$, and $D_{3A}$ on the index object 50A are within the field of view of the camera 26A when the index object 50A and the camera 26A are disposed at the first relative position.

In step S2, the controller 22A causes the camera 26A to image the index object 50A. Specifically, the controller 22A transmits a command to the lighting system 28A to turn ON the lighting system 28A. Due to this, the index object 50A gripped by the robot 24A is illuminated by the lighting system 28A.

Then, the controller 22A transmits an imaging command to the camera 26A. Upon receipt of the imaging command from the controller 22A, the camera 26A images the index object 50A, and acquires imaged data of the index 52A. FIG. 11 illustrates the image generated from the image data captured at this time. In the image 54 illustrated in FIG. 11, the overall image of the index object 50A including the index 52A (the dots $D_{1A}$, $D_{2A}$, and $D_{3A}$) is photographed. The image data, based on which the image 54 is generated, includes the coordinates in the image coordinate system $C_{CA}$ of the pixels representing each of the dots $D_{1A}$, $D_{2A}$, and $D_{3A}$.

In step S3, the controller 22A acquires coordinate data of the index reference points. Specifically, the controller 22A defines, as the index reference point, a predetermined point (e.g., one pixel) in a region of each of the dots $D_{1A}$, $D_{2A}$, and $D_{3A}$ in the image 54 illustrated in FIG. 11, and calculates the coordinates of the index reference points in the image coordinate system $C_{CA}$.

For example, the index reference point is determined as the center point of the region of each of the dots $D_{1A}$, $D_{2A}$, and $D_{3A}$ in the image 54. Hereinafter, for the sake of easy understanding, the index reference points of the dots $D_{1A}$, $D_{2A}$, and $D_{3A}$ are referred to as the index reference points $D_{1A}$, $D_{2A}$, and $D_{3A}$, respectively. The controller 22A stores in the memory the acquired coordinate data of the index reference points $D_{1A}$, $D_{2A}$, and $D_{3A}$.

Figure 6:
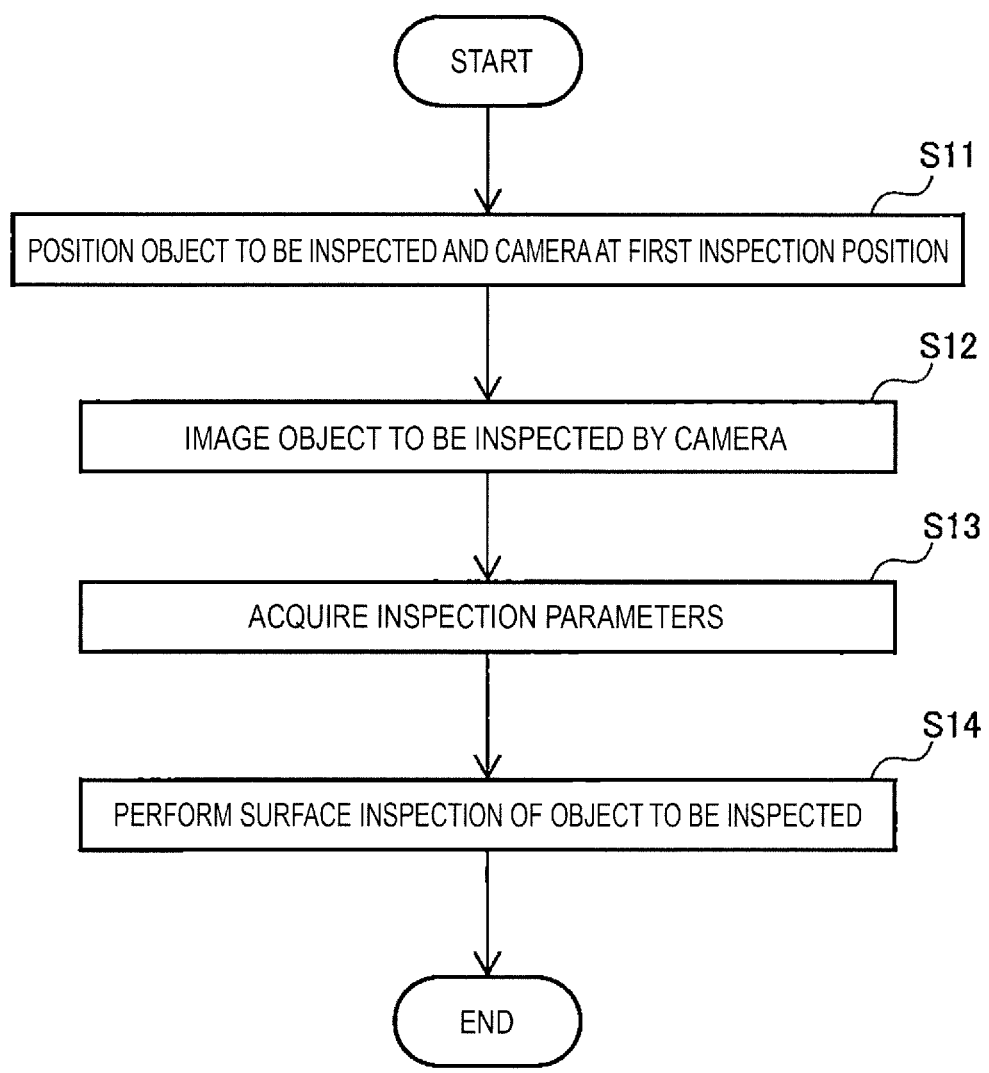
FIG. 6 is a flowchart depicting an example of an operation flow of the first object inspection device.

After carrying out the flow depicted in FIG. 5 to acquire the coordinate data of the index reference points $D_{1A}$, $D_{2A}$, and $D_{3A}$, the flow depicted in FIG. 6 is carried out in the object inspection device 20A. The flow depicted in FIG. 6 is started when the controller 22A of the object inspection device 20A receives a surface inspection command from the host controller, the operator, or the computer program.

Figure 12:
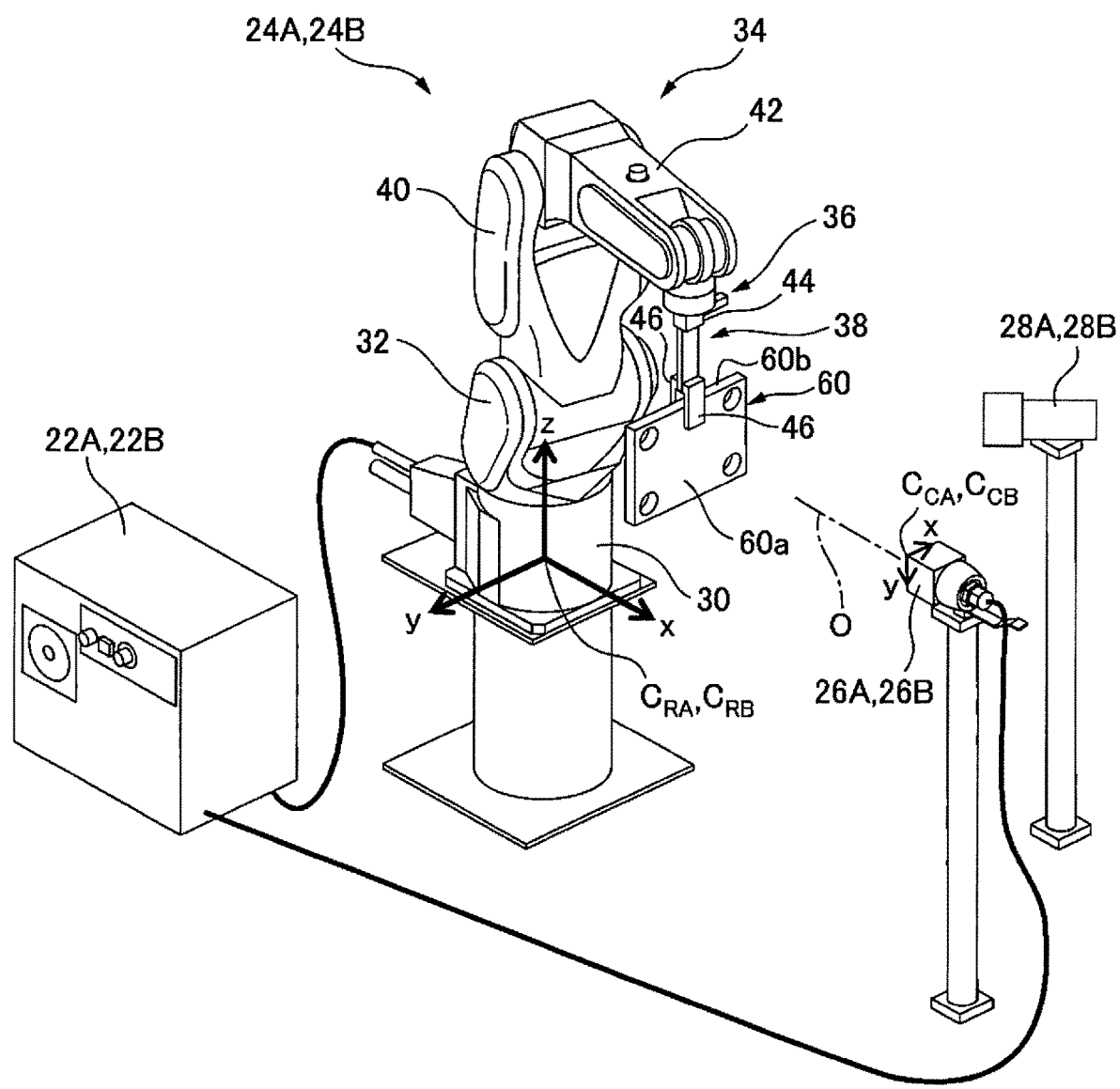
FIG. 12 illustrates a state in which an object to be inspected is positioned with respect to the camera in the object inspection device.

In step S11, the controller 22A operates the robot 24A so as to position an object 60 to be inspected and the camera 26A at the first inspection position, as illustrated in FIG. 12. In this embodiment, the first inspection position is different from the above-described first relative position. In this case, the controller 22A stores in the memory a parameter P (e.g., a coordinate transformation matrix) for shifting in the robot coordinate system $C_{RA}$ from a position of the hand-tip (e.g., TCP: Tool Center Point) of the robot 24A at the first relative position to a position of the hand-tip of the robot 24A at the first inspection position.

In this step S1, the controller 22A operates the robot 24A so as to grip the object 60 to be inspected, which is stored in a predetermined storage location, at a predetermined inspection gripping position by the robot hand 38. This inspection gripping position is e.g. a center of an upper surface 60b of the object 60.

Next, the controller 22A operates the robot 24A so as to move the object 60 to be inspected, and positions the object 60 at the first inspection position with respect to the camera 26A. When the object 60 and the camera 26A are disposed at the first inspection position, at least an area to be inspected in a surface 60a of the object 60 is within the field of view of the camera 26A. In this embodiment, when the object 60 and the camera 26A are disposed at the first inspection position, the entire object 60 is within the field of view of the camera 26A.

Figure 13:
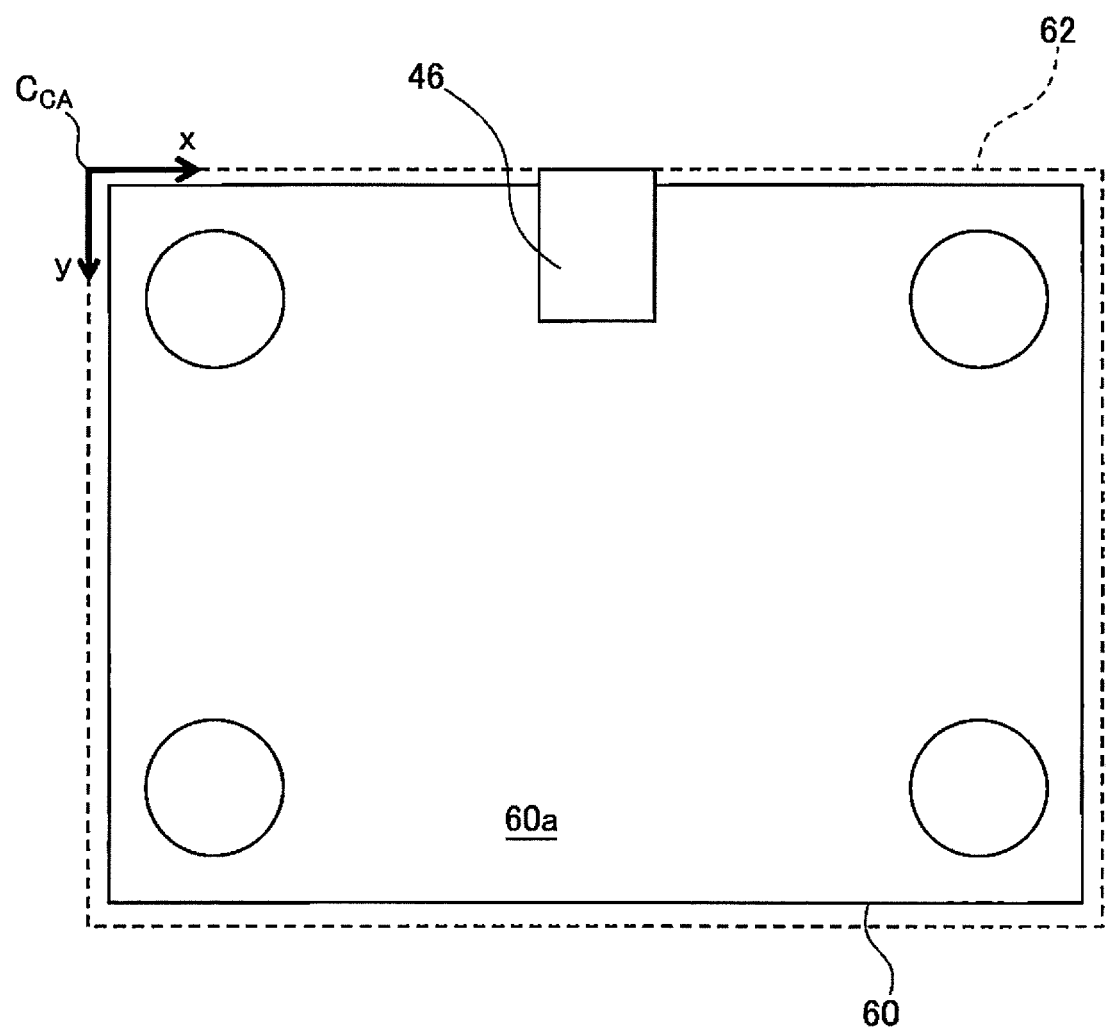
FIG. 13 illustrates an example of an image imaged by the camera in step S12 in FIG. 6.

In step S12, the controller 22A causes the camera 26A to image the object 60 to be inspected. Specifically, the controller 22A transmits a command to the lighting system 28A to turn ON the lighting system 28A. Then, the controller 22A transmits the imaging command to the camera 26A so as to image the object 60 by the camera 26A. FIG. 13 illustrates an image 62 generated from the image data captured by the camera 26A at this time.

In step S13, the controller 22A acquires an inspection parameter. The inspection parameter is a parameter set as various conditions for inspecting the surface 60a of the object 60 to be inspected in step S14 described later. The inspection parameter includes the various conditions such as a degree of coincidence of pattern matching when extracting a feature (a scar, an edge, a hole, etc.) in the image, a threshold of this degree of coincidence for determining whether a defect such as a scar is present, an exposure time for imaging, a size of an inspection window, a threshold of a histogram in this inspection window, and a filtering condition.

As an example, the operator operates an input section (e.g., a keyboard, a computer mouse, and a touch panel) provided at the controller 22A, and sets the various conditions of the inspection parameter, based on the image 62 illustrated in FIG. 13. Thus, the controller 22A acquires and stores the inspection parameter in the memory.

In step S14, the controller 22A carries out the surface inspection of the object 60 to be inspected. Specifically, the controller 22A causes the camera 26A to image the object 60 by the exposure time included in the inspection parameter acquired in step S13, and carries out the surface inspection of the object 60 using the captured image data (e.g., the image 62) and the inspection parameter set in step S13. For example, the controller 22A inspects whether a defect such as a scar is present in the surface 60a of the object 60.

Figure 7:
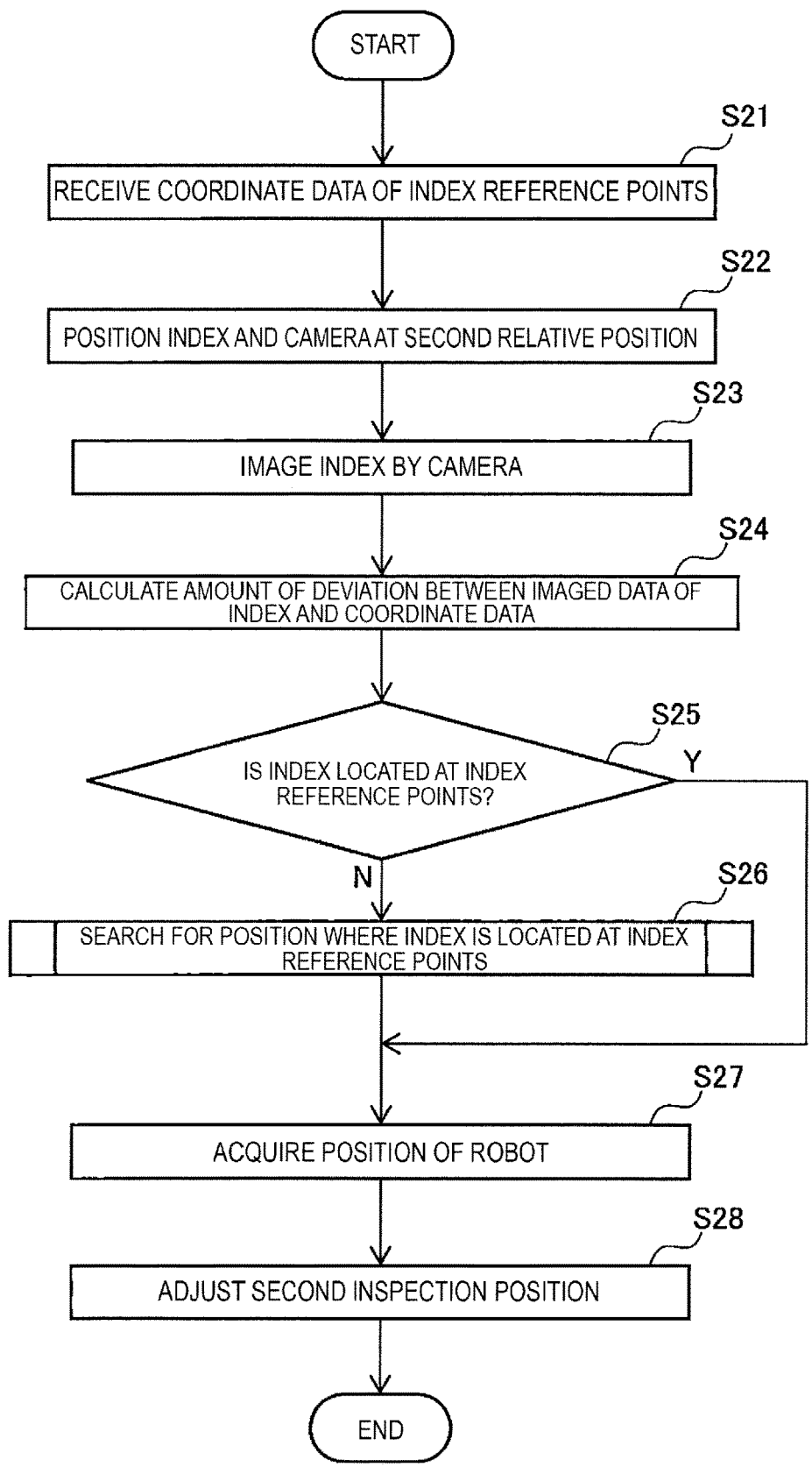
FIG. 7 is a flowchart depicting an example of an operation flow of a second object inspection device.

In this way, the object inspection device 20A can sequentially carry out the surface inspection for a plurality of objects 60 to be inspected. After the inspection parameter is acquired in step S13 in FIG. 6, the flow depicted in FIG. 7 is carried out in the object inspection device 20B. The flow depicted in FIG. 7 is started when the controller 22B of the object inspection device 20B receives an inspection position adjustment command from the host controller, the operator, or the computer program.

In step S21, the controller 22B receives the coordinate data of the index reference points $D_{1A}$, $D_{2A}$, and $D_{3A}$. For example, the controller 22B communicates with the controller 22A to receive from the controller 22A the coordinate data of the index reference points $D_{1A}$, $D_{2A}$, and $D_{3A}$ acquired in above-described step S3. Alternatively, the operator may manually download the coordinate data of the index reference points $D_{1A}$, $D_{2A}$, and $D_{3A}$ from the controller 22A to the controller 22B, using a portable memory, such as EEPROM.

In step S22, the controller 22B operates the robot 24B so as to position the index object 50B and the camera 26B at a second relative position. Specifically, the controller 22B operates the robot 24B so as to grip the index object 50B, which is stored in a predetermined storage location, at the index gripping position by the robot hand 38. The index gripping position at this time is the same as that in above-described step S1. In other words, the position of the index 52B with respect to the hand-tip of the robot 24B is the same as that of the index 52A with respect to the hand-tip of the robot 24A.

Next, the controller 22B operates the robot 24B so as to move the index object 50B, and positions the index object 50B at the second relative position with respect to the camera 26B. The second relative position corresponds to the above-described first relative position. Accordingly, the second relative position is different from the second inspection position. For example, the controller 22B transmits a command the same as the relative position command transmitted by the controller 22A in above-described step S1 to the servomotor 48 of the robot 24B so as to operate the robot 24B. As a result, the index object 50B is disposed at the second relative position with respect to the camera 26B, as illustrated in FIG. 3 and FIG. 4.

In step S23, the controller 22B causes the camera 26B to image the index 52B. Specifically, the controller 22B transmits the command to the lighting system 28B so as to turn ON the lighting system 28B. Next, the controller 22B transmits the imaging command to the camera 26B so as to image the index 52B on the index object 50B by the camera 26B.

In this regard, even when the controller 22B operates the robot 24B in accordance with the relative position command the same as that in step S1 so as to position the index object 50B in step 22, the second relative position of the camera 26B and the index object 50B at the end of step S22 may be deviated from the first relative position of the camera 26A and the index object 50A at the end of step S1.

Such deviation of the relative positions may occur due to an error in dimension or mounting-state between the components of the robots 24A and 24B, an error between the fixed positions of the cameras 26A and 26B, and an error in optical performance between the cameras 26A and 26B, etc.

Figure 14:
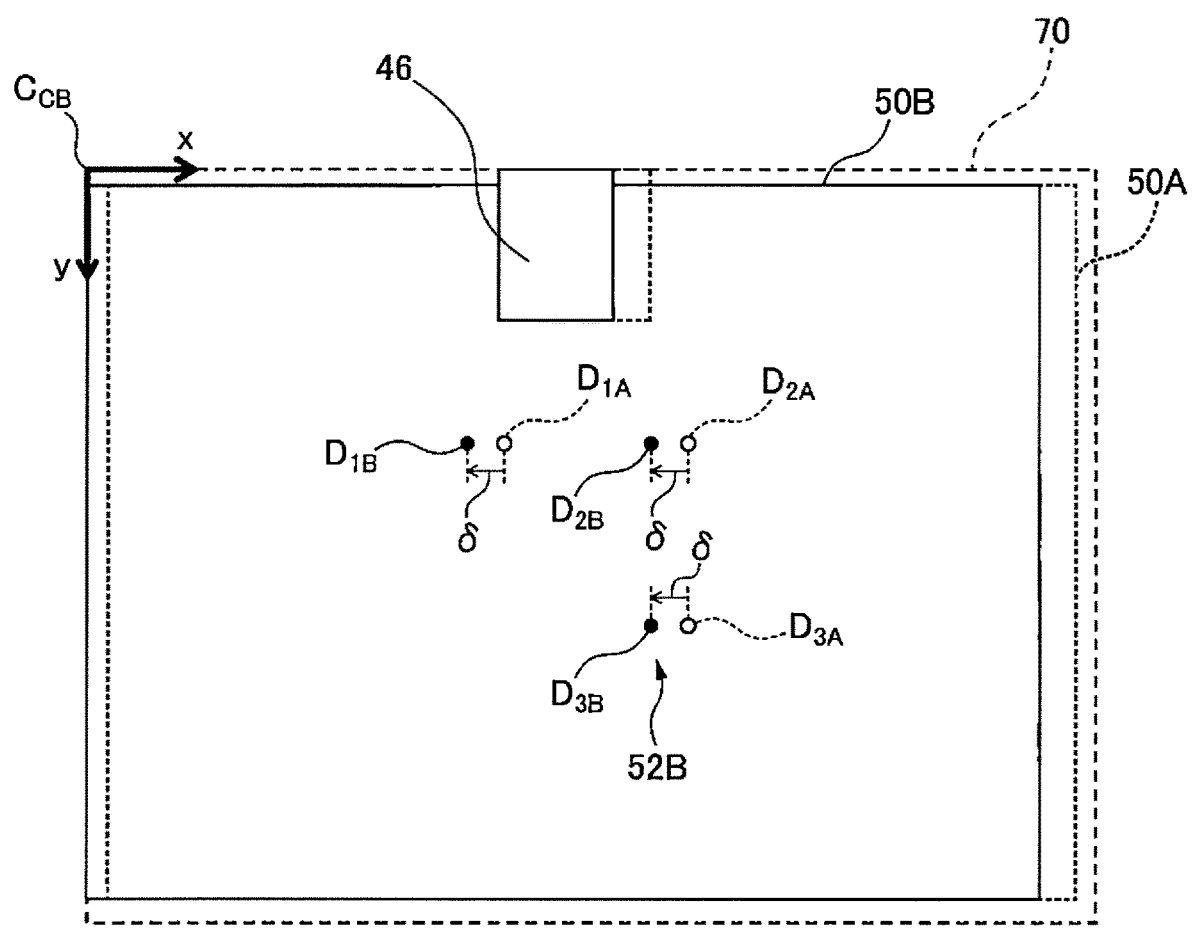
FIG. 14 illustrates an example of an image imaged by the camera in step S23 in FIG. 7.
Figure 15:
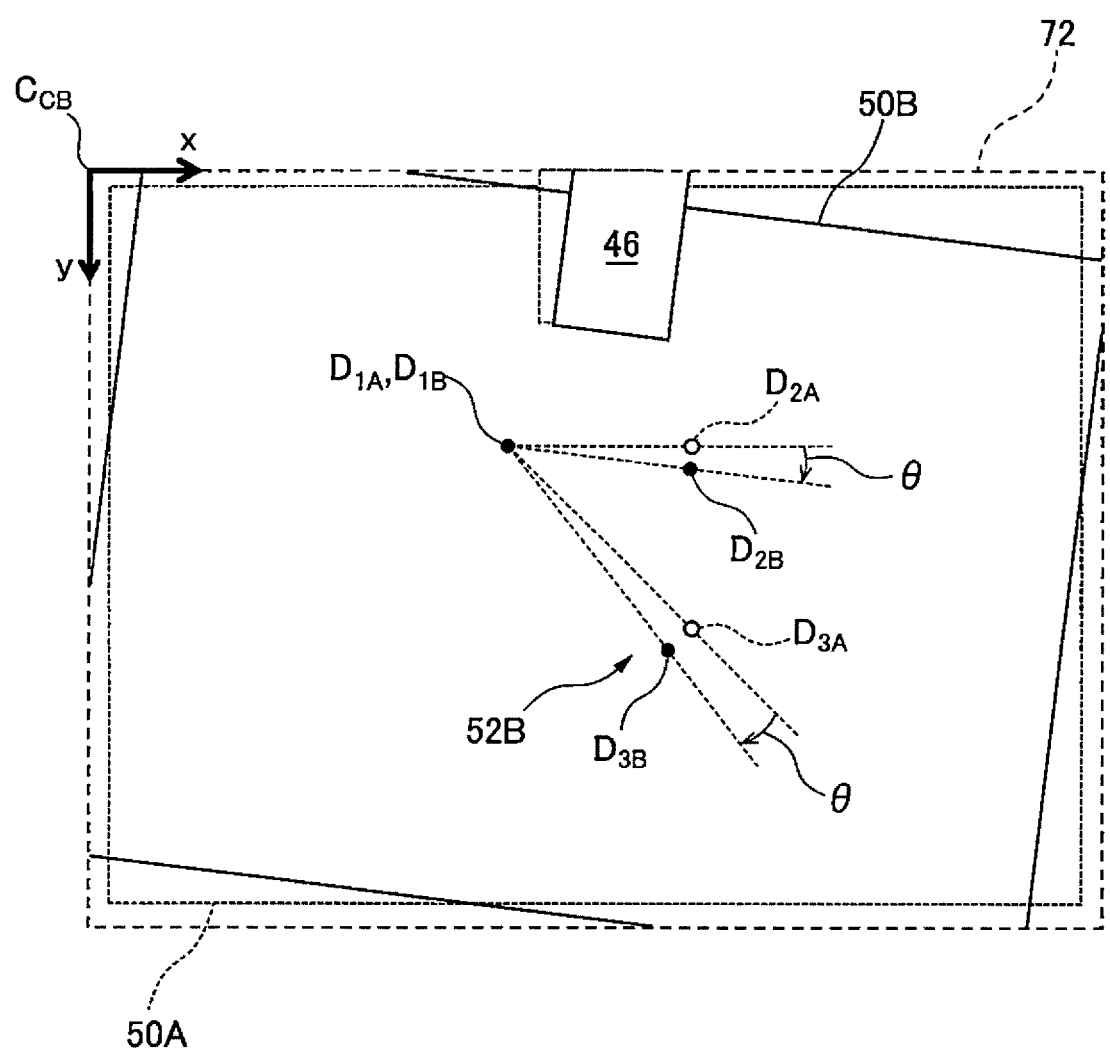
FIG. 15 illustrates an example of an image imaged by the camera in step S23 in FIG. 7.
Figure 16:
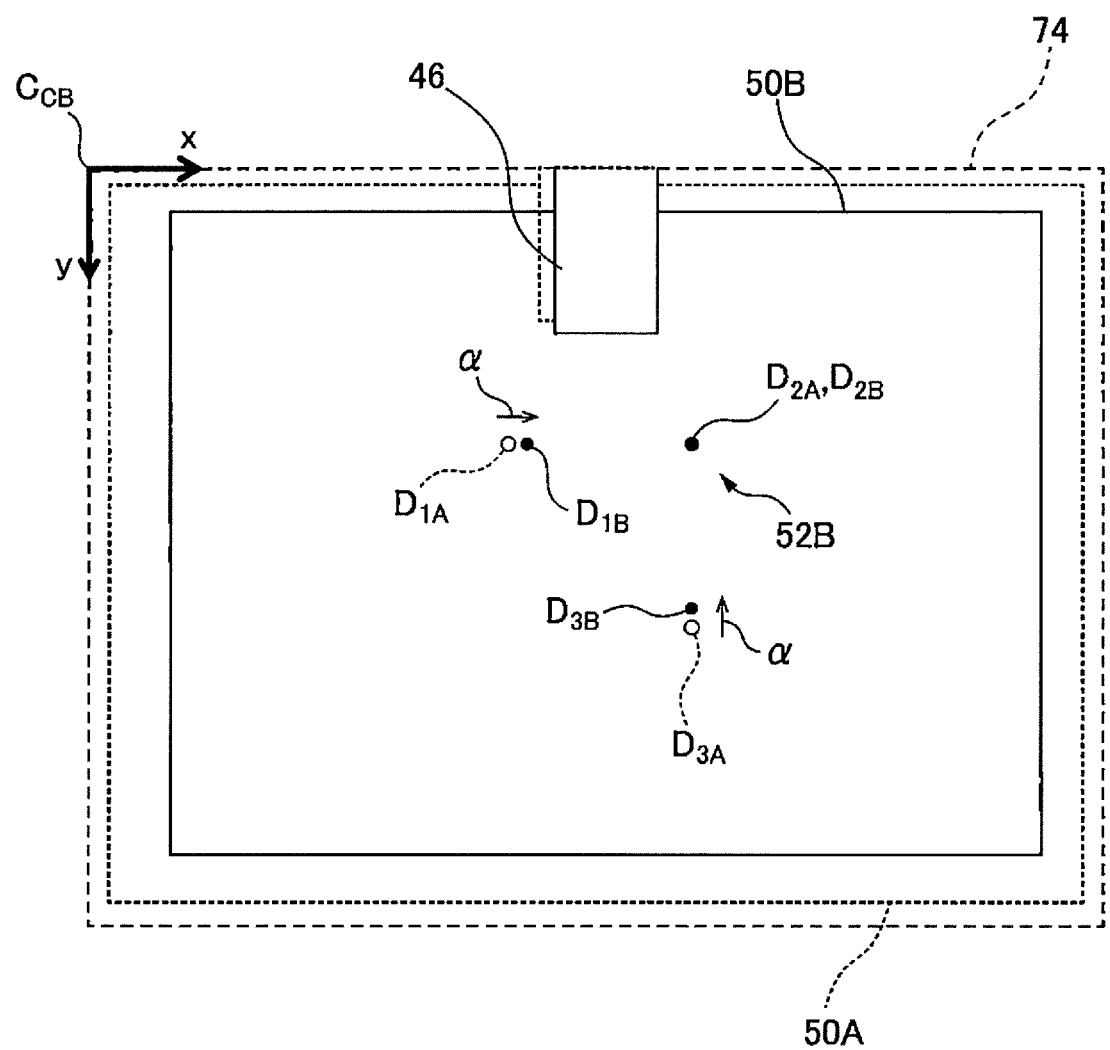
FIG. 16 illustrates an example of an image imaged by the camera in step S23 in FIG. 7.

FIG. 14 to FIG. 16 each illustrate an example of an image generated from the image data captured by the camera 26B in this step S23. Note that, in FIG. 14 to FIG. 16, the index object 50A in the image 54 illustrated in FIG. 11 is superimposed on the images of FIG. 14 to FIG. 16 such that the image coordinate system $C_{CA}$ coincides with the image coordinate system $C_{CB}$, wherein the index object 50A is illustrated by dotted lines, for comparison.

In an image 70 illustrated in FIG. 14, the position of the index object 50B is deviated from that of the index object 50A by a distance δ in the x-axis negative direction of the image coordinate system $C_{CB}$. Such deviation δ occurs when the position of the index object 50B with respect to the camera 26B at the end of step S22 is deviated in the x-axis negative direction of the image coordinate system $C_{CB}$ from that of the index object 50A with respect to the camera 26A at the end of step S1.

In an image 72 illustrated in FIG. 15, the position of the index object 50B is rotated from that of the index object 50A by an angle θ about an imaginary axis (i.e., the optical axis O) orthogonal to the x-y plane of the image coordinate system $C_{CB}$. Such an amount of deviation θ occurs when the position of the index object 50B with respect to the camera 26B at the end of step S22 is deviated from that of the index object 50A with respect to the camera 26A at the end of step S1 about the optical axis O.

In an image 74 illustrated in FIG. 16, the index object 50B is reduced in size by a magnification α compared with the index object 50A. Such an amount of deviation α occurs when the position of the index object 50B with respect to the camera 26B at the end of step S22 is deviated from that of the index object 50A with respect to the camera 26A at the end of step S1 such that the index object 50B is more separated away from the camera 26B in the direction of the optical axis O.

In this embodiment, the controller 22B acquires the position of the robot 24B where the index 52B (the dots $D_{1B}$, $D_{2B}$, and $D_{3B}$) in the image data (the image 70, 72, or 74) imaged by the camera 26B is disposed at the index reference points $D_{1A}$, $D_{2A}$, and $D_{3A}$, by carrying out steps S24 to S27 described later.

In step S24, the controller 22B calculates the amount of deviation between the imaged data of the index 52B captured in step S23 and the coordinate data of the index reference points $D_{1A}$, $D_{2A}$, and $D_{3A}$ received in step S21. Specifically, the controller 22B defines, as a detection point, a predetermined point (e.g., one pixel) in a region of each of the dots $D_{1B}$, $D_{2B}$, and $D_{3B}$ in the image data (the image 70, 72, or 74) imaged in step S23, and calculates the coordinates of the respective detection points in the image coordinate system $C_{CB}$.

In this regard, the detection points are set such that the positions thereof in the regions of the dots $D_{1B}$, $D_{2B}$, and $D_{3B}$ are the same as those of the index reference points in the regions of the dots $D_{1A}$, $D_{2A}$, and $D_{3A}$, respectively. That is, if the index reference points are defined as the center points of the regions of the dots $D_{1A}$, $D_{2A}$, and $D_{3A}$, the detection points are defined as the center points of the dots $D_{1B}$, $D_{2B}$, and $D_{3B}$, respectively.

Hereinafter, for the sake of easy understanding, the detection points in the dots $D_{1B}$, $D_{2B}$, and $D_{3B}$ are referred to as the detection points $D_{1B}$, $D_{2B}$, and $D_{3B}$, respectively. The controller 22B respectively calculates, as the amount of deviation, a first difference $\Delta_1$ between the coordinates of the index reference point $D_{1A}$ and the coordinates of the detection point $D_{1B}$, a second difference $\Delta_2$ between the coordinates of the index reference point $D_{2A}$ and the coordinates of the detection point $D_{2B}$, and a third difference $\Delta_3$ between the coordinates of the index reference point $D_{3A}$ and the coordinates of the detection point $D_{3B}$.

In step S25, the controller 22B determines whether the index 52B imaged in step S23 is disposed at the index reference points $D_{1A}$, $D_{2A}$, and $D_{3A}$ in the image coordinate system $C_{CB}$. Specifically, the controller 22B determines whether the first difference $\Delta_1$, the second difference $\Delta_2$, and the third difference $\Delta_3$ are less than or equal to a predetermined threshold value $\Delta_{th}$ (i.e., $\Delta_1 \leq \Delta_{th}$, $\Delta_2 \leq \Delta_{th}$, and $\Delta_3 \leq \Delta_{th}$). If the differences $\Delta_1$, $\Delta_2$, and $\Delta_3$ are less than or equal to the threshold $\Delta_{th}$, the controller 22B determines that the index 52B is disposed at the index reference points $D_{1A}$, $D_{2A}$, and $D_{3A}$ (i.e., determines YES), and proceeds to step S27 while holding the robot 24B.

On the other hand, when the difference $\Delta_1$, $\Delta_2$, or $\Delta_3$ is greater than the threshold $\Delta_{th}$ (i.e., $\Delta_1 > \Delta_{th}$, $\Delta_2 > \Delta_{th}$, or $\Delta_3 > \Delta_{th}$), the controller 22B determines that the index 52B is not disposed at the index reference points $D_{1A}$, $D_{2A}$, and $D_{3A}$ (i.e., determines NO), and proceeds to step S26.

In step S26, the controller 22B searches for the position of the robot 24B where the index 52B is disposed at the index reference points $D_{1A}$, $D_{2A}$, and $D_{3A}$. This step S26 will be described with reference to FIG. 8. Note that, in the flow depicted in FIG. 8, processes similar to those of FIG. 7 are assigned the same step numbers, and detailed descriptions thereof will be omitted.

In step S31, the controller 22B changes the relative position of the index object 50B and the camera 26B. Specifically, the controller 22B operates the robot 24B so as to move the index object 50B by a predetermined amount of movement in a predetermined direction in the robot coordinate system CB. The direction in which the index object 50B is to be moved at this time includes e.g. the directions of the x-axis (i.e., the optical axis O), the y-axis, and the z-axis of the robot coordinate system $C_{RB}$, and directions about the x-axis, the y-axis, and the z-axis of the robot coordinate system $C_{RB}$. The movement direction and the amount of movement at this time can be predetermined by the operator.

After step S31, the controller 22B sequentially carries out the above-described steps S23 to S25. When the controller 22B determines YES in step S25 in FIG. 8, the controller 22B proceeds to step S27 in FIG. 7 while holding the robot 24B. On the other hand, when the controller 22B determines NO in step 25 in FIG. 8, the controller 22B returns to step S31.

Figure 8:
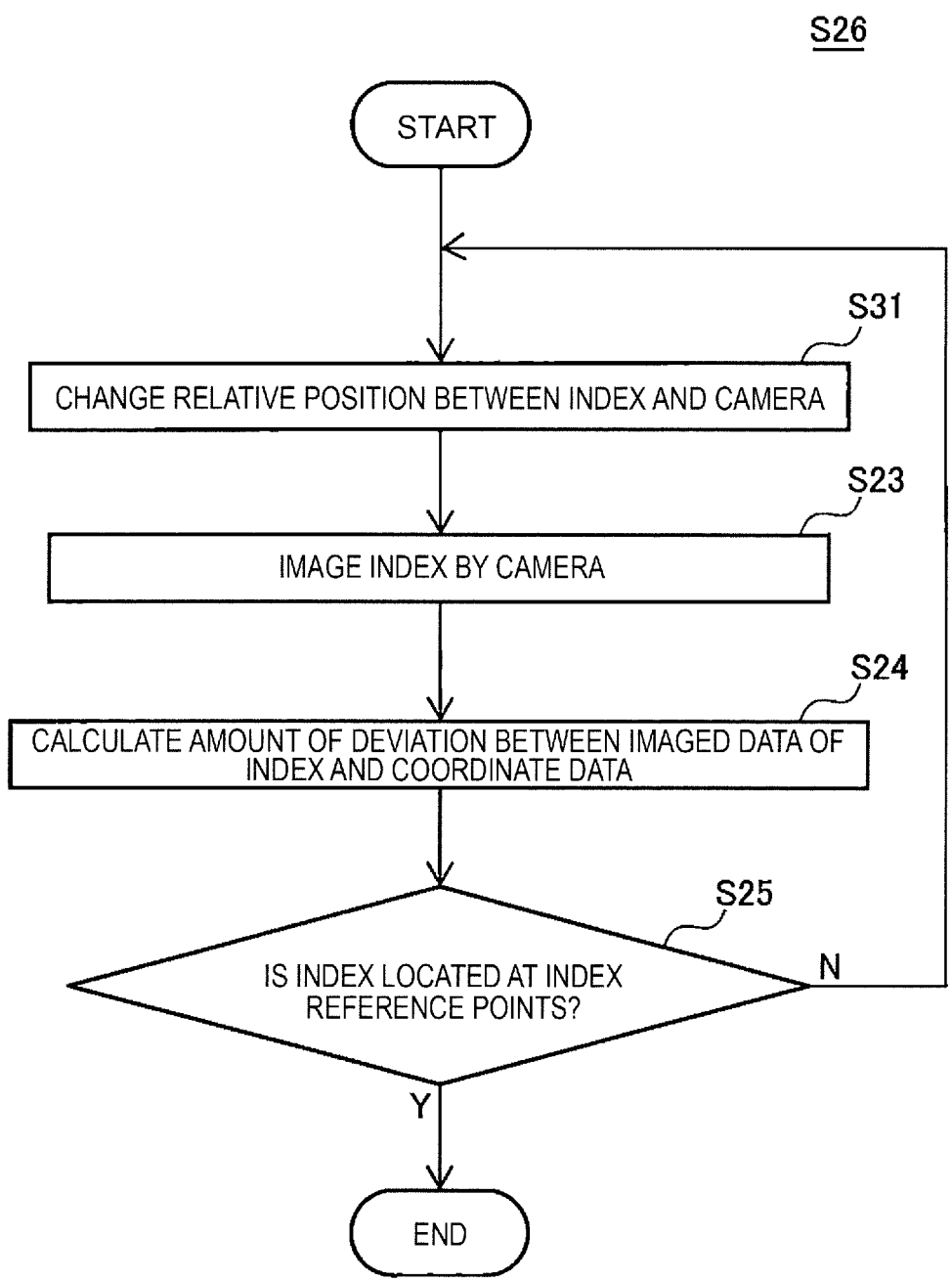
FIG. 8 is a flowchart depicting an example of step S26 in FIG. 7.

In this way, the controller 22B repeatedly carries out steps S31 and S23 to S25 until it determines YES in step S25 in FIG. 8. Note that, if the controller 22B determines NO in step S25 after carrying out step S31, the controller 22B may return the position of the index object 50B, which has been changed in step S31, to the position before carrying out step S31.

The controller 22B may change the movement direction of the index object 50B in accordance with a predetermined order, each time the controller 22B carries out step S31. This order may be determined as e.g. x-axis positive direction→x-axis negative direction→y-axis positive direction→y-axis negative direction→z-axis positive direction→z-axis negative direction→direction about the x-axis→direction about the y-axis→direction about the z-axis of the robot coordinate system $C_{RB}$. In this way, the controller 22B searches for the position of the robot 24B where the index 52B is disposed at the index reference points $D_{1A}$, $D_{2A}$, and $D_{3A}$.

Next, another example of step S26 will be described with reference to FIG. 9. In step S41, the controller 22B transforms the amount of deviation (differences $\Delta_1$, $\Delta_2$, and $\Delta_3$) between the imaged data of the index 52B captured in step S23 and the coordinate data of the index reference points $D_{1A}$, $D_{2A}$, and $D_{3A}$ into the robot coordinate system $C_{RB}$. As described above, the coordinates in the image coordinate system $C_{CB}$ can be transformed into those in the robot coordinate system $C_{RB}$.

The controller 22B transforms the coordinates of the detection points $D_{1B}$, $D_{2B}$, and $D_{3B}$ in the image coordinate system $C_{CB}$ acquired in the above-described step S24 into coordinates $C_{1B}$, $C_{2B}$, and $C_{3B}$ in the robot coordinate system $C_{RB}$, respectively. Further, the controller 22B transforms the coordinates of the index reference points $D_{1A}$, $D_{2A}$, and $D_{3A}$ in the image coordinate system $C_{CA}$ (i.e., coordinates in the image coordinate system $C_{CB}$) received in above-described step S21 into coordinates $C_{1A}$, $C_{2A}$, and $C_{3A}$ in the robot coordinate system $C_{RB}$, respectively.

The controller 22B calculates a first difference $\Delta_{1\_R}$ between the coordinates $C_{1B}$ and $C_{1A}$, second difference $\Delta_{2\_R}$ between the coordinates $C_{2B}$ and $C_{2A}$, and third difference $\Delta_{3\_R}$ between the coordinates $C_{3B}$ and $C_{3A}$ in the robot coordinate system $C_{RB}$, respectively. In this way, the controller 22B can transform the differences $\Delta_1$, $\Delta_2$, and $\Delta_3$ in the image coordinate system $C_{CB}$ into the differences $\Delta_{1\_R}$, $\Delta_{2\_R}$, and $\Delta_{3\_R}$ in the robot coordinate system $R_{CB}$.

In step S42, the controller 22B operates the robot 24B such that the differences $\Delta_{1\_R}$, $\Delta_{2\_R}$, and $\Delta_{3\_R}$ in the robot coordinate system $R_{CB}$ acquired in step S41 are zero. Specifically, the controller 22B determines the position in the robot coordinate system $R_{CB}$ where the index object 50B (i.e., the robot hand 38) should be disposed in order to make these differences $\Delta_{1\_R}$, $\Delta_{2\_R}$, and $\Delta_{3\_R}$ to be zero, based on the differences $\Delta_{1\_R}$, $\Delta_{2\_R}$, and $\Delta_{3\_R}$ acquired in step S41.

Then, the controller 22B generates a command to each servomotor 48 for disposing the index object 50B at the determined position, and transmits it to each servomotor 48. In this way, the controller 22B can dispose the index object 50B at the position where the differences $\Delta_{1\_R}$, $\Delta_{2\_R}$, and $\Delta_{3\_R}$ are zero.

When the index object 50B is disposed at the position where the differences $\Delta_{1\_R}$, $\Delta_{2\_R}$, and $\Delta_{3\_R}$ are zero, the index 52B imaged by the camera 26B at this time can be regarded to be disposed at the index reference points $D_{1A}$, $D_{2A}$, and $D_{3A}$. After the end of this step S42, the controller 22B proceeds to step S27 in FIG. 7 while holding the robot 24B.

Referring again to FIG. 7, in step S27, the controller 22B acquires the position of the robot 24B. For example, the controller 22B acquires, as the position of the robot 24B, the rotation angle of each servomotor 48. The position of the robot 24B acquired at this time is that at the time of the determination of YES in step S25 in FIG. 7, at the time of the determination of YES in step S25 in FIG. 8, or at the time of the end of step S42 in FIG. 9.

In step S28, the controller 22B adjusts the second inspection position. As described above, in the surface inspection of the object 60 to be inspected by the object inspection device 20B, the object 60 and the camera 26B are positioned at the second inspection position by the robot 24B. The controller 22B pre-stores in the memory the position of the robot 24B corresponding to the second inspection position.

In this step S28, the controller 22B adjusts the preset second inspection position using the position of the robot 24B acquired in step S27. Specifically, the controller 22B acquires the above-described parameter P from the controller 22A.

Then, using the position of the robot 24B acquired in step S27 and the parameter P, the controller 22B adjusts the second inspection position set at the start of step S28 to a position where the position acquired in step S27 is shifted by the parameter P. At the second inspection position after this adjustment, the robot 24B is disposed at the position where the hand-tip of the robot 24B is further shifted from the position acquired in step S27 by the parameter P in the robot coordinate system $C_{RB}$.

In this embodiment, as described above, the positional relation of the robot coordinate system $C_{RA}$ with respect to the robot 24A is the same as that of the robot coordinate system $C_{RB}$ with respect to the robot 24B. In this case, the controller 22B can shift the position acquired in step S27 in the robot coordinate system $C_{RB}$ using the parameter P acquired from the controller 22A, when adjusting the second inspection position.

As another example, a common robot coordinate system among the robots 24A and 24B can be set. In this case, the above-described parameter P is acquired as a value in this common robot coordinate system. The controller 22B shifts the position acquired in step S27 by the parameter P in this common robot coordinate system, when adjusting the second inspection position in step S28.

As still another example, the robot coordinate systems $C_{RA}$ and $C_{RB}$ can be set such that the positional relation of the robot coordinate system $C_{RA}$ with respect to the robot 24A is different from that of the robot coordinate system $C_{RB}$ with respect to the robot 24B. In this case, a difference β between the positional relation of the robot coordinate system $C_{RA}$ with respect to the robot 24A and the positional relation of the robot coordinate system $C_{RB}$ with respect to the robot 24B is preliminarily acquired.

When adjusting the second inspection position in this step S28, the controller 22B transforms the parameter P acquired as the value in the robot coordinate system $C_{RA}$ into a parameter P' in the robot coordinate system $C_{RB}$ using the difference β, and shifts the position acquired in step S27 by this parameter P'.

Figure 10:
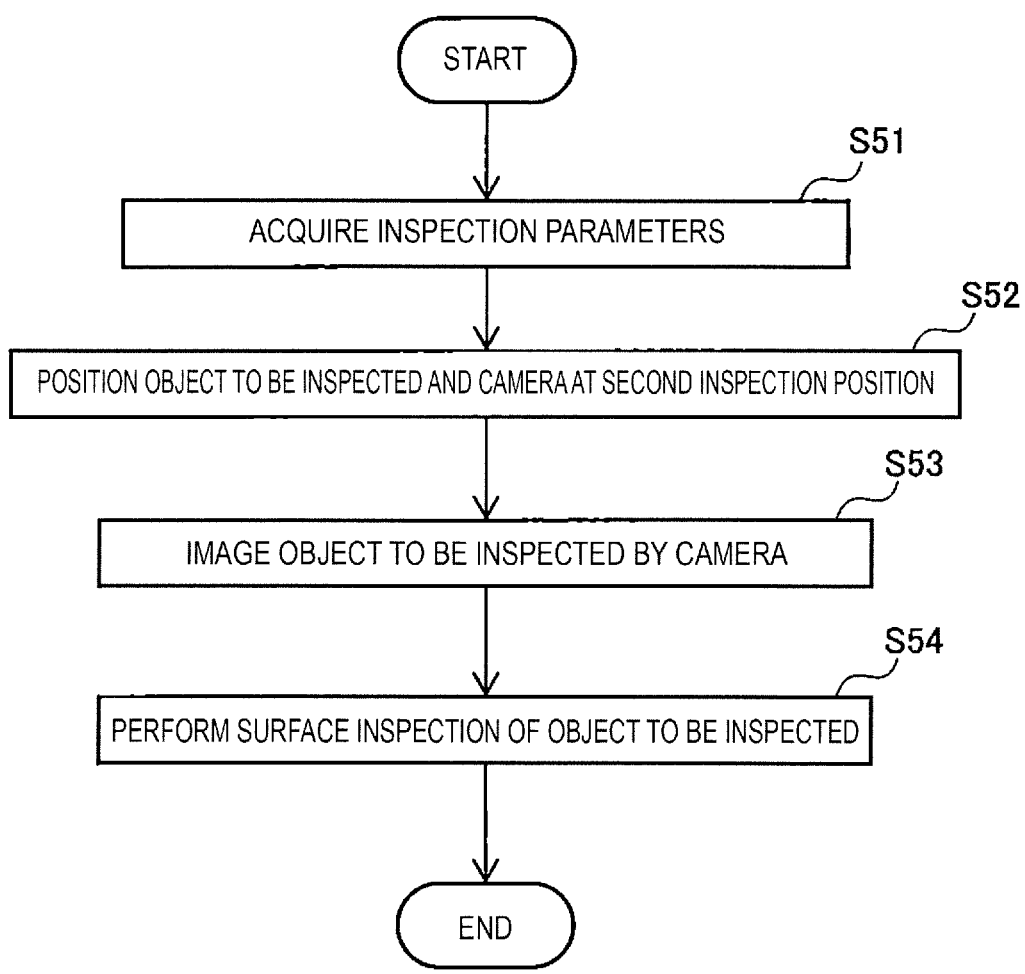
FIG. 10 is a flowchart depicting an example of an operation flow of the second object inspection device.

After the end of the flow of FIG. 7, the flow depicted in FIG. 10 is carried out in the object inspection device 20B. The flow depicted in FIG. 10 is started when the controller 22B of the object inspection device 20B receives a surface inspection command from the host controller, the operator, or the computer program.

In step S51, the controller 22B acquires the inspection parameter from the controller 22A of the object inspection device 20A. For example, the controller 22B communicates with the controller 22A to download from the controller 22A the inspection parameter set in the above-described step S13. Alternatively, the operator may manually download the inspection parameter from the controller 22A to the controller 22B, using the portable memory such as EEPROM.

In step S52, the controller-22B positions the object 60 to be inspected and the camera 26B at the second inspection position adjusted in the above-described step S28. Specifically, the controller 22B operates the robot 24B so as to grip the object 60 to be inspected, which is stored in a predetermined storage location, by the robot hand 38 at the position the same as the inspection gripping position where the robot 24A grips the object 60 to be inspected in the above-described steps S11 and S14.

Next, the controller 22B locates the robot 24B gripping the object 60 at the second inspection position adjusted in step S28. As a result, the relative position of the object 60 gripped by the robot 24B and the camera 26B at this time can be coincided with that of the object 60 gripped by the robot 24A and the camera 26A in the above-described steps S11 and S14.

In step S53, the controller 22B causes the camera 26B to image the object 60 gripped by the robot 24B. The position of the object 60 in the image captured by the camera 26B at this time is matched with the position of the object 60 in the image 62 (FIG. 13) captured by the camera 26A in the above-described step S14. In other words, the image imaged by the camera 26B in this step S53 is substantially the same as the image 62.

In step S54, the controller 22B carries out the surface inspection of the object 60 to be inspected. Specifically, the controller 22B carries out the surface inspection (e.g., inspect whether the defect such as a scar is present) of the object 60, using the inspection parameter acquired in step S51 and the image data of the object 60 imaged in step S53.

As described above, according to this embodiment, the position of the object 60 in the image imaged by the camera 26A for the surface inspection in the object inspection device 20A can be matched with the position of the object 60 in the image imaged for the surface inspection in the object inspection device 20B. Due to this configuration, the inspection parameter can be shared among the plurality of object inspection devices 20A and 20B. Further, the image data imaged by the plurality of object inspection devices 20A and 20B can be shared among them, and used for e.g. the machine learning.

In addition, when the controller 22B determines NO in step S25, it repeatedly carries out steps S31 and S23 to S25 in FIG. 8 in order to search for the position of the robot 24B where the index 52B is disposed at the index reference points $D_{1A}$, $D_{2A}$, and $D_{3A}$. Due to this configuration, it is possible to automatically search for the position of the robot 24B where the index 52B is disposed at the index reference points $D_{1A}$, $D_{2A}$, and $D_{3A}$.

Figure 9:
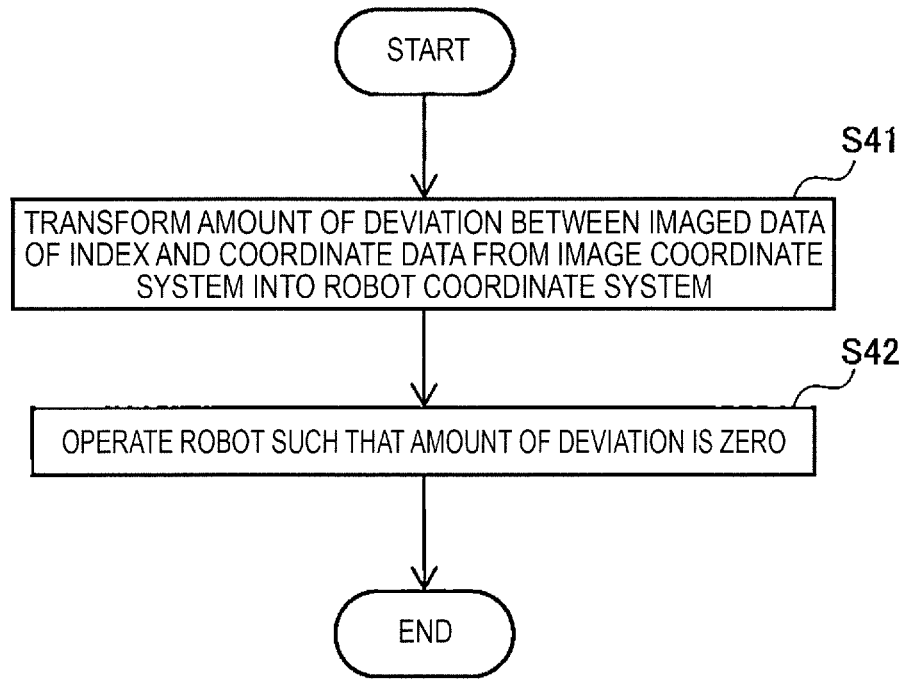
FIG. 9 is a flowchart depicting another example of step S26 in FIG. 7.

Alternatively, when the controller 22B determines NO in step S25 in FIG. 7, it carries out steps S41 and S42 depicted in FIG. 9 in order to search for the position of the robot 24B where the index 52B is disposed at the index reference points $D_{1A}$, $D_{2A}$, and $D_{3A}$. Due to this configuration, the controller 22B can determine the position where the index object 50B should be positioned in the robot coordinate system $C_{RB}$ from the amount of deviation (i.e., the differences $\Delta_1$, $\Delta_2$, and $\Delta_3$) in the image coordinate system $C_{CB}$ obtained in step S24. Thus, it is possible to automatically and quickly search for the position of the robot 24B where the index 52B is disposed at the index reference points $D_{1A}$, $D_{2A}$, and $D_{3A}$.

Further, in this embodiment, the controller 22B compares the amount of deviation $\Delta_1$, $\Delta_2$, and $\Delta_3$ with the predetermined threshold value $\Delta_{th}$ in step S25, and determines YES when the amount of deviation is smaller than the threshold. Due to this configuration, it is possible to automatically determine whether the index 52B is disposed at the index reference points $D_{1A}$, $D_{2A}$, and $D_{3A}$, with a comparably simple algorithm.

In the above-described embodiment, the first relative position is different from the first inspection position, and the second relative position is different from the second inspection position before the adjustment in step S28. However, the first relative position may be the same positional relation as the first inspection position, and also the second relative position may be the same positional relation as the second inspection position before the adjustment.

In this case, in step S1, the controller 22A causes the robot 24A to grip the index object 50A in place of the object 60 to be inspected, and preliminarily position the index object 50A and the camera 26A at the first inspection position. Further, in step S22, the controller 22B causes the robot 24B to grip the index object 50B in place of the object 60 to be inspected, and preliminarily position the index object 50B and the camera 26B at the second inspection position.

Due to this configuration, it is possible to use the position of the robot 24B acquired in step S27 as the second inspection position. Accordingly, the process for shifting the position of the robot 24B acquired in step S27 by the parameter P in step S28 can be omitted.

In the above-described embodiment, in step S54, the controller 22B may set new inspection parameter by adjusting the inspection parameter acquired in step S51 based on the image data of the object 60 to be inspected captured by the camera 26B for the surface inspection.

For example, the operator operates the input section (e.g., the keyboard, the computer mouse, and the touch panel) provided in the controller 22B so as to reset the various conditions of the inspection parameter acquired in step S51, based on the image imaged in step 54. Thus, the controller 22B acquires and stores the new inspection parameter in the memory. Then, the controller 22A may download the new inspection parameter from the controller 22B for update, and carries out the surface inspection of the object 60 to be inspected using the new inspection parameter.

In the above-described embodiment, one point (e.g., center point) in the region of each of the dots $D_{1A}$, $D_{2A}$, and $D_{3A}$ in the image 54 illustrated in FIG. 11 is defined as the index reference point. However, a plurality of points in the region of each of the dots $D_{1A}$, $D_{2A}$, and $D_{3A}$ may be set as index reference points.

In this case, in each region of the dots $D_{1B}$, $D_{2B}$, and $D_{3B}$ in the image data (the image 70, 72, or 74) imaged in step S23, a plurality of points corresponding to the plurality of index reference points are acquired as detection points. Then, in step S24, the controller 22B calculates the respective amounts of deviation between the index reference points and the detection points corresponding to each other, wherein the positional relation of the index reference points with respect to one dot region is the same as that of the detection points with respect to the one dot region.

Further, steps S24 to S26 can be omitted from the flow depicted in FIG. 7. For example, the controller 22B displays the image 70, 72, or 74 imaged by the camera 26B in step S23 in FIG. 7 on a display (not illustrated) provided in the controller 22B. Further, the controller 22B displays the index reference points $D_{1A}$, $D_{2A}$, and $D_{3A}$ (or the dots $D_{1A}$, $D_{2A}$, and $D_{3A}$) so as to be superimposed on the image 70, 72, or 74 displayed on the display.

The operator operates e.g. a teach pendant so as to jog the robot 24B, and manually moves the hand-tip of the robot 24B in the direction of the x-axis (optical axis O), the y-axis, or the z-axis, or in the direction about the x-axis, the y-axis, or the z-axis of the robot coordinate system $C_{RB}$. The operator visually determines whether the index 52B (dots $D_{1B}$, $D_{2B}$, and $D_{3B}$) in the image 70, 72, or 74 displayed in the display is disposed at the index reference points $D_{1A}$, $D_{2A}$, and $D_{3A}$ (or the dots $D_{1A}$, $D_{2A}$, and $D_{3A}$).

When the operator determines that the index 52B is disposed at the index reference points $D_{1A}$, $D_{2A}$, and $D_{3A}$, the operator transmits a command to the controller 22B to carry out steps S27 and S28. In this manner, the operator can manually search for the position of the robot 24B where the index 52B is disposed at the index reference points $D_{1A}$, $D_{2A}$, and $D_{3A}$.

Further, in the flow depicted in FIG. 8, the operator can manually carry out step S31. Specifically, in step S31, the operator operates e.g. the teach pendent while viewing the image 70, 72, or 74 displayed on the display of the controller 22B, and manually moves the hand-tip of the robot 24B. After the end of the manual operation by the operator, the controller 22B carries out steps S23 to S25.

In this case, when the controller 22B determines NO in step S25 in FIG. 8, the controller 22B may output a warning for notifying the operator that the index 52B is not disposed at the index reference points $D_{1A}$, $D_{2A}$, and $D_{3A}$. For example, this warning can be generated in the form of voice or image showing that "The index is not disposed at the index reference points."

Further, in step S26 depicted in FIG. 9, the controller 22B may further carries out the above-described steps S23 to S25 after step S42. In this case, when the controller 22B determines YES in step S25 carried out after step S42, it proceeds to step S27 in FIG. 7, while the controller 22B returns to step S41 when it determines NO in step S25 after step S42.

In the above-described embodiment, the camera 26A can image the entire object 60 to be inspected. However, the surface 60a of the object 60 may be divided into a total of "n" (n is an integer of 2 or greater) sections, wherein the object inspection device 20A may be configured such that the camera 26A can image the n-th section of the surface 60a of the object 60 when the camera 26A and the object 60 are disposed at the n-th inspection position. In this case, the controller 22A repeatedly performs the process of disposing the camera 26A and the object 60 at the n-th inspection position and imaging the n-th section by the camera 26A for n=1 to n, when carrying out the surface inspection of the object 60 in step S14.

Similarly, in the object inspection device 20B, the surface 60a of the object 60 to be inspected may be divided into a total of "n" (n is an integer of 2 or greater) sections, wherein the controller 22B repeatedly performs the process of disposing the camera 26B and the object 60 at the n-th inspection position and imaging the n-th section by the camera 26B for n=1 to n, when carrying out the surface inspection of the object 60 in step S54.

Further, in step S2 in FIG. 5, instead of causing the real camera 26A to image the index 52A in real space, the controller 22A may generate imaginary imaged data in a simulation by simulatively imaging an index model which models the index 52A by a camera model which models the camera 26A in an imaginary space, wherein the imaginary imaged data may be stored as the coordinate data of the index reference points. In this case, the controller 22B carries out the above-described steps S24 and S25 based on the coordinate data of the index reference points obtained from the imaginary imaged data generated by the controller 22A.

In the above-described embodiment, the index 52A, 52B is comprised of three dots (i.e., $D_{1A}$, $D_{2A}$ and $D_{3A}$, or $D_{1B}$, $D_{2B}$ and $D_{3B}$). However, the index 52A, 52B may have four or more dots. Such an embodiment is illustrated in FIG. 17.

Figure 17:
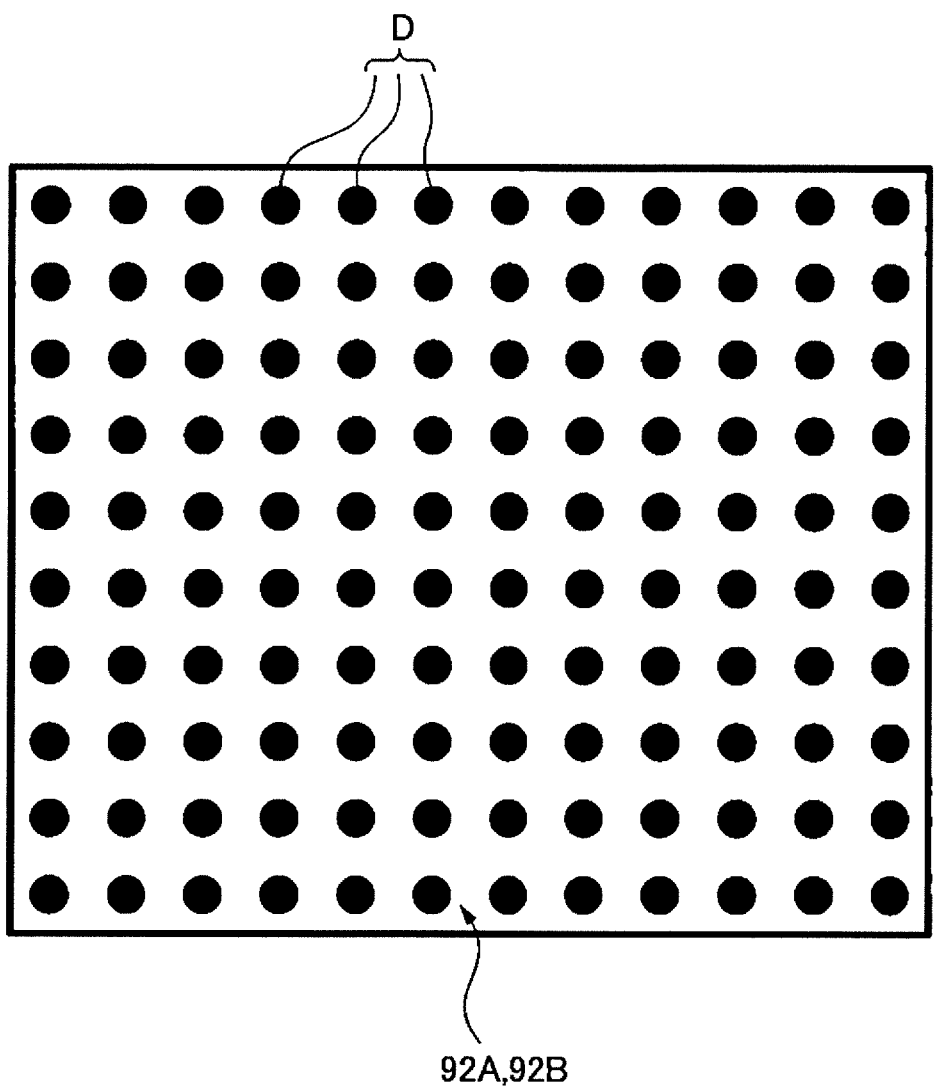
FIG. 17 is a drawing of an index object according to another embodiment.

Index objects 90A and 90B illustrated in FIG. 17 includes index 92A and index 92B, respectively, and each of the indices 92A and 92B has a total of 120 dots D disposed in a square lattice pattern. These index objects 90A and 90B can be employed instead of the above-described index objects 50A and 50B, respectively. In this case, in the above-described step S3, the controller 22A may define a predetermined point (center point) in a region of each dot $D_{nA}$ (n=1 to 120) in the index object 90A imaged in step S2 as the index reference point $D_{nA}$.

Further, in the above-described Step S24, the controller 22B may define the predetermined point (center point) in a region of each dot $D_{nB}$ (n=1 to 120) in the index object 90B imaged in step S23 as the detection point $D_{nB}$, and calculate an n-th difference $\Delta_n$ between the coordinates of the index reference point $D_{nA}$ and the coordinates of the detection point $D_{nB}$. In this respect, the position of the dot $D_{nA}$ (index reference point $D_{nA}$) in the index object 90A is the same as the position of the dot $D_{nB}$ (inspection point $D_{nB}$) in the index object 90B.

The index 52A, 52B may be any detectable visual feature, such as a corner of the object, a hole formed at the object, or an edge of the object. For example, in the above-described Step S3, the controller 22A may define, as the index reference point, the corner of the object or the center point of the hole in the imaged data captured by the camera 26A, and calculate the coordinates of this index reference point in the image coordinate system $C_{CA}$. Additionally, the index object 50A, 50B with the index 52A, 52B may have any outer shape.

Further, as long as the position of the index 52A with respect to the robot hand-tip when the robot 24A grips the index object 50A at the index gripping position being the same as that of the index 52B with respect to the robot hand-tip when the robot 24B grips the index object 50B at the index gripping position, the index objects 50A and 50B may have outer shapes different from each other. Moreover, the index object 50A or 50B may have the outer shape the same as or different from the object 60 to be inspected.

Additionally, the lighting system 28A or 28B may be omitted from the above-described object inspection device 20A or 20B, and the object 50A, 50B, or 60 may be illuminated with e.g. natural light. Furthermore, in the above-described embodiment, the robots 24A and 24B are the vertical articulated robots, however, the robots 24A and 24B may be any type of robots such as horizontal articulated robots, parallel link robots, or loaders. The object inspection system 10 may include an additional object inspection device in addition to the object inspection devices 20A and 20B. In this case, similar to the object inspection device 20B, a controller in this additional object inspection device carries out the flows depicted in FIG. 7 to FIG. 10.

In the above-described embodiment, the cameras 26A and 26B are fixed at the predetermined positions, and the robots 24A and 24B move the index objects 50A and 50B and the object 60 to be inspected. However, the index objects 50A and 50B and the object 60 may be fixed at predetermined positions, and the cameras 26A and 26B may be moved by the robots 24A and 24B.

Figure 18:
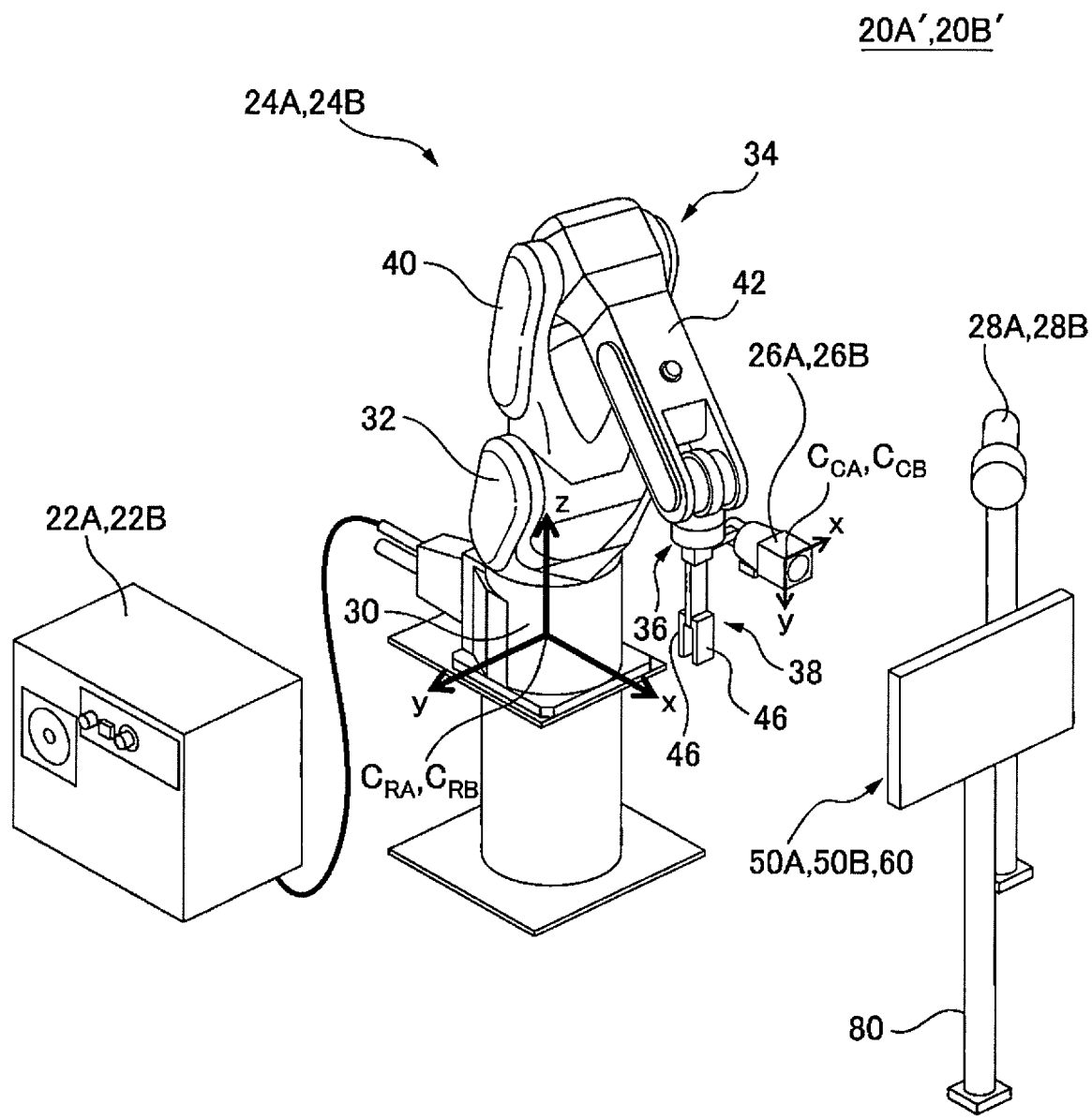
FIG. 18 is a perspective view of an object inspection device according to another embodiment.

Such an embodiment is illustrated in FIG. 18. In an object inspection device 20A' illustrated in FIG. 18, the camera 26A is fixed to the wrist 36 of the robot 24A. On the other hand, the index object 50A and the object 60 are fixed to a holder 80 and disposed at a predetermined position in the robot coordinate system $C_{RA}$ so as to be separate from the robot 24A. Information on the fixed position of the object 50A or 60 in the robot coordinate system $C_{RA}$ is pre-stored in the memory of the controller 22A.

The position of the camera coordinate system $C_{CA}$ with respect to the hand-tip (TCP) of the robot 24A is known. Accordingly, the coordinates in one of the camera coordinate system $C_{CA}$ and the robot coordinate system $C_{RA}$ when the hand-tip of the robot 24A is disposed at any position can be transformed into the coordinates in the other of the camera coordinate system $C_{CA}$ and the robot coordinate system $C_{RA}$, via the transformation matrix (e.g., a Jacobian matrix).

Similarly, in an object inspection device 20B', the camera 26B is fixed to the wrist 36 of the robot 24B, while the index object 50B and the object 60 are fixed to the holder 80, and the information on the fixed position of the object 50B or 60 in the robot coordinate system Cm is pre-stored in the memory of the controller 22B.

Furthermore, since the position of the camera coordinate system $C_{CB}$ with respect to the hand-tip (TCP) of the robot 24B is known, the coordinates in one of the camera coordinate system $C_{CB}$ and the robot coordinate system $C_{RB}$ when the hand-tip of the robot 24B is disposed at any position can be transformed into the coordinates in the other of the camera coordinate system $C_{CB}$ and the robot coordinate system $C_{RB}$, via the transformation matrix (e.g., a Jacobian matrix).

When carrying out the flows in FIG. 5 and FIG. 6 in the object inspection device 20A', in the above-described steps S1 and S11, the controller 22A operates the robot 24A so as to move the camera 26A with respect to the object 50A or 60. Moreover, when carrying out the flows in FIG. 7 to FIG. 10 in the object inspection device 20B', in the above-described steps S22, S31, S42, and S52, the controller 22B operates the robot 24B so as to move the camera 26B with respect to the object 50A or 60. The object inspection devices 20A' and 20B' can share the inspection parameter and the captured image data by carrying out the flows depicted in FIG. 5 to FIG. 10.

While the present disclosure has been described through specific embodiments, the above-described embodiments do not limit the invention as defined by the appended claims.

The invention claimed is:

1. An object inspection device for inspecting a surface of an object using image data of the object, the object inspection device comprising:
   a camera configured to acquire the image data;
   a robot configured to relatively position the object and the camera at an inspection position where the surface is to be inspected;
   an index object configured to be gripped by the robot at a predetermined gripping position and moved with respect to the camera by the robot to be imaged by the camera, the index object including an index configured for representing a position of the index with respect to the camera in an image coordinate system of the camera; and
   a controller configured to control the camera and the robot, the controller being configured to:
      acquire, as coordinate data of an index reference point, imaged data of another index object in another image coordinate system of another camera, the imaged data of the other index object being imaged by the other camera having the other image coordinate system when another robot grips the index object at another predetermined gripping position at a first relative position;
      control the robot so as to position the index object and the camera at a second relative position, the position of the another index with respect to the another robot when the another robot grips the another index object at the another predetermined gripping position being the same as that of the index with respect to the robot when the robot grips the index object at the gripping position;
      cause the camera to image the index on the index object positioned at the second relative position to acquire imaged data of the index in the image coordinate system;
      based on the imaged data of the index and the coordinate data of the index reference point, hold the robot at a position where the index is disposed at the index reference point in the image coordinate system; and
      adjust the inspection position using the position of the robot when the index is disposed at the index reference point.

2. The object inspection device of claim 1, wherein the controller is configured to:
   preliminarily position the index object with respect to the camera at the inspection position as the second relative position; and
   cause the camera to image the index preliminarily positioned at the inspection position to acquire the imaged data of the index.

3. The object inspection device of claim 1, wherein the controller is configured to determine whether the index is disposed at the index reference point in the image coordinate system.

4. The object inspection device of claim 3, wherein the controller is configured to, when the controller determines that the index is not disposed at the index reference point in the image coordinate system, repeatedly carry out changing the relative position of the index object and the camera and acquiring imaged data of the index after changing the relative position, until the controller determines that the index is disposed at the index reference point.

5. The object inspection device of claim 3,
wherein the controller is configured to compare an amount of deviation between the imaged data of the index and the coordinate data with a predetermined threshold, and determine that the index is disposed at the index reference point when the amount of deviation is smaller than the threshold.

6. An object inspection system comprising a plurality of object inspection devices each configured to inspect a surface of an object using image data of the object, wherein
a first object inspection device includes:
a first camera configured to acquire the image data;
a first robot configured to relatively position the object and the first camera at a first inspection position where the surface is to be inspected;
a first index object configured to be gripped by the first robot at a predetermined first gripping position and moved with respect to the first camera by the first robot to be imaged by the first camera, the first index object including a first index configured for representing a position of the first index with respect to the first camera in a first image coordinate system of the first camera; and
a first controller configured to control the first camera and the first robot, the first controller being configured to:
control the first robot so as to position the first index object and the first camera at a first relative position; and
cause the first camera to image the first index on the first index object positioned at the first relative position to acquire imaged data of the first index in the first image coordinate system, and store the imaged data as coordinate data of an index reference point, wherein
a second object inspection device includes:
a second camera configured to acquire the image data;
a second robot configured to relatively position the object and the second camera at a second inspection position where the surface is to be inspected, the second inspection position corresponding to the first inspection position;
a second index object configured to be gripped by the second robot at a predetermined second gripping position and moved with respect to the second camera by the second robot to be imaged by the second camera, the second index object including a second index configured for representing a position of the second index with respect to the second camera in a second image coordinate system of the second camera, the second image coordinate system corresponding to the first image coordinate system, the position of the second index with respect to the second robot when the second robot grips the second index object at the second gripping position being the same as that of the first index with respect to the first robot when the first robot grips the first index object at the first gripping position; and
a second controller configured to control the second camera and the second robot, the second controller being configured to:
control the second robot so as to position the second index object and the second camera at a second relative position corresponding to the first relative position;
cause the second camera to image the second index on the second index object positioned at the second relative position to acquire imaged data of the second index in the second image coordinate system;
based on the imaged data of the second index and the coordinate data of the index reference point stored in the first controller, hold the second robot at a position where the second index is disposed at the index reference point in the second image coordinate system; and
adjust the second inspection position using the position of the second robot when the second index is disposed at the index reference point.

7. The object inspection system of claim 6, wherein the first controller is configured to cause the first camera to image the first index object at the first inspection position to acquire imaged data of the object in the first image coordinate system, and acquire and store an inspection parameter set as various conditions for the inspection carried out based on the imaged data of the first index object, wherein
the second controller is configured to obtain the inspection parameter from the first controller.

8. The object inspection system of claim 7, wherein the second controller is configured to:
preliminarily position the second index object with respect to the second camera at the second inspection position as the second relative position; and
cause the second camera to image the second index object preliminarily positioned at the second inspection position to acquire the imaged data of the second index.

9. An object inspection system comprising a plurality of object inspection devices each configured to inspect a surface of an object using image data of the object, wherein
a first object inspection device includes:
a first camera configured to acquire the image data;
a first robot configured to relatively position the object and the first camera at a first inspection position where the surface is to be inspected;
a first index configured to be positioned with respect to the first camera by the first robot and imaged by the first camera, the first index being configured for representing a position of the first index with respect to the first camera in a first image coordinate system of the first camera; and
a first controller configured to control the first camera and the first robot, the first controller being configured to:
control the first robot so as to position the first index and the first camera at a first relative position; and
cause the first camera to image the first index positioned at the first relative position to acquire imaged data of the first index in the first image coordinate system, and store the imaged data as coordinate data of an index reference point, wherein
a second object inspection device includes:

a second camera configured to acquire the image data;
a second robot configured to relatively position the object and the second camera at a second inspection position where the surface is to be inspected, the second inspection position corresponding to the first inspection position;
second index configured to be positioned with respect to the second camera by the second robot and imaged by the second camera, the second index being configured for representing a position of the second index with respect to the second camera in a second image coordinate system of the second camera, the second image coordinate system corresponding to the first image coordinate system; and
a second controller configured to control the second camera and the second robot, the second controller being configured to:
control the second robot so as to position the second index and the second camera at a second relative position corresponding to the first relative position;
cause the second camera to image the second index positioned at the second relative position to acquire imaged data of the second index in the second image coordinate system;
based on the imaged data of the second index and the coordinate data of the index reference point stored in the first controller, hold the second robot at a position where the second index is disposed at the index reference point in the second image coordinate system; and
adjust the second inspection position using the position of the second robot when the second index is disposed at the index reference point,
wherein the first controller is configured to cause the first camera to image the object at the first inspection position to acquire imaged data of the object in the first image coordinate system, and acquire and store an inspection parameter set as various conditions for the inspection carried out based on the imaged data of the object,
wherein the second controller is configured to obtain the inspection parameter from the first controller,
wherein the second controller is configured to cause the second camera to image the object at the second inspection position to acquire imaged data of the object in the second image coordinate system, and acquire and store a new inspection parameter reset by adjusting the inspection parameter based on the imaged data of the object imaged by the second camera, and
wherein the first controller is configured to obtain the new inspection parameter from the second controller to update the inspection parameter.

10. A method of adjusting an inspection position, where a surface of an object is to be inspected, in an object inspection device for inspecting the surface using image data of the object, wherein
the object inspection device comprises:
a camera configured to acquire the image data;
a robot configured to relatively position the object and the camera at an inspection position where the surface is to be inspected; and
an index object configured to be gripped by the robot at a predetermined gripping position and moved with respect to the camera by the robot be imaged by the camera, the index object including an index configured for representing a position or the index with respect to the camera in an image coordinate system of the camera, wherein
the method comprises:
acquiring, as coordinate data of an index reference point, imaged data of another index object in another image coordinate system of another camera, the imaged data of the other index object being imaged by the other camera having the other image coordinate system when another robot grips the index object at another predetermined gripping position at a first relative position;
controlling the robot to position the index object and the camera at a second relative position, the position of the another index with respect to the another robot when the another robot grips the another index object at the another predetermined gripping position being the same as that of the index with respect to the robot when the robot grips the index object at the gripping position;
causing the camera to image the index on the index object positioned at the second relative position to acquire imaged data of the index in the image coordinate system;
based on the imaged data of the index and the coordinate data of the index reference point, holding the robot at a position where the index is disposed at the index reference point in the mage coordinate system; and
adjusting the inspection position using the position of the robot when the index is disposed at the index reference point.

11. A method of adjusting an inspection position, where a surface of an object is to be inspected, in an object inspection system comprising a plurality of object inspection devices each configured to inspect the surface using image data of the object, wherein
a first object inspection device includes:
a first camera configured to acquire the image data;
a first robot configured to relatively position the object and the first camera at a first inspection position where the surface is to be inspected; and
a first index object configured to be gripped by the first robot at a predetermined first gripping position and moved with respect to the first camera by the first robot to be imaged by the first camera, the first index object including a first index configured for representing a position of the first index with respect to the first camera in a first image coordinate system of the first camera, wherein
a second object inspection device includes:
a second camera configured to acquire a second robot configured to the image data;
a second robot configured to relatively position the object and the second camera at a second inspection position where the surface is to be inspected, the second inspection position corresponding to the first inspection position; and
a second index object configured to be gripped by the second robot at a predetermined second gripping position and moved with respect to the second camera by the second robot to be imaged by the second camera, the second index object including a second index being configured for representing a position of the second index with respect to the second camera in a second image coordinate system of the second camera, the second image coordinate system corresponding to the first image coordinate system, the position of the second index with respect to the second robot when the second robot grips the second index object at the second gripping position being the same as that of the first index with respect to the first robot when the first robot grips the first index object at the first gripping position, wherein the method comprises:

controlling the first robot so as to position the first index object and the first camera at a first relative position;

causing the first camera to image the first index object positioned at the first relative position to acquire imaged data of the first index in the first image coordinate system, and store the imaged data as coordinate data of an index reference point;

controlling the second robot so as to position the second index object and the second camera at a second relative position corresponding to the first relative position;

causing the second camera to image the second index object positioned at the second relative position to acquire imaged data of the second index in the second image coordinate system;

based on the imaged data of the second index and the stored coordinate data of the index reference point, holding the second robot at a position where the second index is disposed at the index reference point in the second image coordinate system; and adjusting the second inspection position using the position of the second robot when the second index is disposed at the index reference point.

* * * * *